(12) United States Patent
Kawano

(10) Patent No.: US 12,061,824 B2
(45) Date of Patent: Aug. 13, 2024

(54) SETTING INFORMATION MANAGEMENT METHOD, SETTING INFORMATION MANAGEMENT SYSTEM, AND PRINTER DRIVER

(71) Applicant: SHARP KABUSHIKI KAISHA, Sakai (JP)

(72) Inventor: Shinichi Kawano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/202,623

(22) Filed: May 26, 2023

(65) Prior Publication Data
US 2023/0384985 A1 Nov. 30, 2023

(30) Foreign Application Priority Data
May 30, 2022 (JP) .................. 2022-087575

(51) Int. Cl.
G06F 3/12 (2006.01)
(52) U.S. Cl.
CPC .......... *G06F 3/1205* (2013.01); *G06F 3/1254* (2013.01); *G06F 3/1281* (2013.01); *G06F 3/1291* (2013.01)
(58) Field of Classification Search
CPC .... G06F 3/1291; G06F 3/1281; G06F 3/1254; G06F 3/1205
See application file for complete search history.

(56) References Cited

U.S. PATENT DOCUMENTS

| | | | |
|---|---|---|---|
| 2009/0006652 A1* | 1/2009 | Kasatani | H04N 1/00204 709/248 |
| 2021/0089244 A1* | 3/2021 | Sawaguchi | G06F 3/1285 |

FOREIGN PATENT DOCUMENTS

JP 2015-176532 A 10/2015

* cited by examiner

*Primary Examiner* — John R Wallace
(74) *Attorney, Agent, or Firm* — ScienBiziP, P.C.

(57) ABSTRACT

A setting information management method of a setting information management system that manages setting information about a function of an image forming device that is conducted in an information processing device, wherein the method includes: saving in which setting contents of a plurality of setting items are saved; saving of setting information in which collective setting information is saved; deciding of sharing setting in which the plurality of setting items include information of collective setting sharing, and whether it is enabled that the collective setting information is commonly used or not is decided; delivering of setting information in which saved collective setting information is delivered to the plurality of information processing devices; and acquiring of setting information and saved as sharing setting information; wherein, when it is enabled in the information of collective setting sharing that the collective setting information is commonly used, the collective setting information is commonly used.

16 Claims, 29 Drawing Sheets

FIG. 4

| COLLECTIVE SETTING INFORMATION SD   42 | | | | |
|---|---|---|---|---|
| NO | FC | F | SVDT | SET |
| SETTING INFORMATION NAME | FUNCTION ITEM NAME | CAPABILITY OF SHARING | SAVING DATE INFORMATION | SETTING CONTENT |
| S_001 | FC01 | 2 (ENABLED) | DT001 | SET01 |
| S_002 | FC02 | 2 (ENABLED) | DT002 | SET02 |
| S_003 | FC03 | 2 (ENABLED) | DT003 | SET03 |
| S_004 | FC04 | 2 (ENABLED) | DT004 | SET04 |
| S_005 | FC05 | 1 (DISABLED) | DT005 | SET05 |

| SHARING SETTING FLAG F   43 | 1 | DISABLED (OFF) | (COLLECTIVE SETTING INFORMATION IS NOT SHARED) |
|---|---|---|---|
| | 2 | ENABLED (ON) | (COLLECTIVE SETTING INFORMATION IS SHARED) |

FIG. 5

| INHERENT SETTING INFORMATION CD | 92 | | |
|---|---|---|---|
| CDNO | CDFC | CDDT | CDSET |
| SETTING INFORMATION NAME | FUNCTION ITEM NAME | SAVING DATE INFORMATION | SETTING CONTENT |
| C1_001 | FC11 | DT101 | CST101 |
| C1_002 | FC12 | DT102 | CST102 |

| SHARING SETTING INFORMATION SD | 93 | | | |
|---|---|---|---|---|
| SDNO | SDFC | F | PCDT | PCSET |
| SETTING INFORMATION NAME | FUNCTION ITEM NAME | CAPABILITY OF SHARING | SHARING SETTING DATE INFORMATION | SETTING CONTENT |
| S_001 | FC01 | 2 (ENABLED) | DT001 | SET01 |
| S_002 | FC02 | 2 (ENABLED) | DT002 | SET02 |
| S_003 | FC03 | 2 (ENABLED) | DT003 | SET03 |
| S_004 | FC04 | 2 (ENABLED) | DT004 | SET04 |
| S_005 | FC05 | 1 (DISABLED) | DT005 | SET05 |

| SAVING DATE INFORMATION SVDT | 94 | DT111 | =(4/25/2022) |
|---|---|---|---|

WHEN RECEIVED SAVING DATE INFORMATION SVDT IS NEWER THAN SHARING SETTING DATE INFORMATION PCDT (SVDT: 4/25/2022 > PCDT: 3/1/2022),

SHARING SETTING INFORMATION SD IS UPDATED.

FIG. 6

| NAME | KIND | DATA |
|---|---|---|
| share_daytime_carbon_copy_size | REG_DWORD | 0x00000000 (0) |
| share_daytime_different_paper_size | REG_DWORD | 0x00000000 (0) |
| share_daytime_func_carbon_copy | REG_SZ | 2,20211222165701,carbon_copy |
| share_daytime_func_different_paper | REG_SZ | 2,20211222165701,different_paper |
| share_daytime_func_separator | REG_SZ | 2,20211222165701,separator |
| share_daytime_func_tab_print | REG_SZ | 2,20211222165701,tab_print |
| share_daytime_func_user_setting | REG_SZ | 2,20211222165701,user_setting |
| share_daytime_func_watermark | REG_SZ | 2,20211222165701,watermark |
| share_daytime_func_woven_pattern | REG_SZ | 2,20211222165701,woven_pattern |
| share_daytime_separator_size | REG_DWORD | 0x00000000 (0) |
| share_daytime_tab_print | REG_BINARY | 32 00 30 00 32 00 31 00 31 00 32 00 32 00 32 00 31 00... |
| share_daytime_tab_print_size | REG_DWORD | 0x00000794 (1940) |
| share_daytime_user_setting | REG_BINARY | 32 00 30 00 32 00 31 00 31 00 32 00 32 00 32 00 31 00... |
| share_daytime_user_setting_size | REG_DWORD | 0x000045da (17882) |
| share_daytime_watermark | REG_BINARY | 32 00 30 00 32 00 31 00 31 00 32 00 32 00 32 00 31 00... |
| share_daytime_watermark_size | REG_DWORD | 0x00000b04 (2820) |
| share_daytime_woven_pattern_size | REG_DWORD | 0x00000000 (0) |

FIG. 7

| NAME | KIND | DATA |
|---|---|---|
| share_daytime_func_carbon_copy | REG_SZ | 1,20211223093429 |
| share_daytime_func_different_paper | REG_SZ | 1,20211223093429 |
| share_daytime_func_separator | REG_SZ | 1,20211223093429 |
| share_daytime_func_tab_print | REG_SZ | 1,20211223093429 |
| share_daytime_func_user_setting | REG_SZ | 1,20211223093429 |
| share_daytime_func_watermark | REG_SZ | 1,20211223093429 |
| share_daytime_func_woven_pattern | REG_SZ | 1,20211223093429 |
| share_daytime_separator_size | REG_DWORD | 0x00000000 (0) |
| share_daytime_tab_print | REG_BINARY | 32 00 30 00 32 00 31 00 31 00 32 00 32 00 32 00 31 00... |
| share_daytime_tab_print_size | REG_DWORD | 0x00000794 (1940) |
| share_daytime_user_setting | REG_BINARY | 32 00 30 00 32 00 31 00 31 00 32 00 32 00 32 00 31 00... |
| share_daytime_user_setting_size | REG_DWORD | 0x000045da (17882) |
| share_daytime_watermark | REG_BINARY | 32 00 30 00 32 00 31 00 31 00 32 00 32 00 32 00 31 00... |
| share_daytime_watermark_size | REG_DWORD | 0x00000b04 (2820) |
| share_daytime_woven_pattern_size | REG_DWORD | 0x00000000 (0) |

PRINT SETTING SCREEN OF PRINT SETTING
ITEMS: G4
(INPUT OF COLLECTIVE SETTING INFORMATION
(FAVORITE) NAME)

PRINT SETTING SCREEN OF PRINT
SETTING ITEMS: G5

SETTING INFORMATION MANAGEMENT METHOD, SETTING INFORMATION MANAGEMENT SYSTEM, AND PRINTER DRIVER

CROSS-REFERENCE TO RELATED APPLICATION

The present application claims priority from Japanese Application JP2022-087575, the content to which is hereby incorporated by reference into this application.

BACKGROUND OF THE INVENTION

1. Field of the Invention

This disclosure relates to a setting information management method and a setting information management system that manage setting information about a predetermined function, and particularly relates to, for example, a setting information management method and a setting information management system that deliver setting information about printing of an image forming device to an information processing device that uses the image forming device.

2. Description of the Related Art

Conveniently, there is utilized an image forming device having a plurality of functions such as a printing function, a manuscript reading function, a transmitting function of read image data, an acquiring function of image data, a character recognizing function, etc. When a user attempts to use the image forming device from an information processing device such as a personal computer owned by the user via a network, a driver software for utilizing the image forming device is installed on the information processing device, the driver software is activated, and a desired function of the image forming device is conducted.

Further, for example, when a printing function is conducted in a predetermined application program included in the information processing device, the user selects and inputs pieces of setting information of setting items about printing (number of papers to be printed, manuscript size, printing direction, selection of color/monochromatic, paper size to be printed, ratio of enlargement or reduction, etc.), and then, the printing is started. In this case, information about the manuscript that is to be printed and the pieces of setting information that are selected and inputted are transmitted to the image forming device and the image forming device conducts a printing process using these pieces of setting information.

In principle, input of the setting information about the printing function, etc. needs to be conducted each time when the user conducts the printing function, etc.

However, when there is a plurality of items to be set and inputted, in order to reduce an effort of the user to set and input these items, the pieces of setting information that the user usually uses are collectively saved as collective setting information and the saved collective setting information is accessed when the function is conducted and the setting information of each of the setting items is automatically set.

Further, there is known an information processing system including a client PC, a printer, and a server PC that are connected to each other via a network in which the server PC includes a language monitor having a function of sharing information between the server and the client, pieces of setting information (setting file) that are set and saved in the server PC are written on the language monitor at a timing when the server PC starts printing, an application of the client PC starts an update process of the pieces of setting information at a timing when the application is activated, an update of the setting file is commanded to the language monitor and thereby the setting file is delivered from the language monitor to the client PC, the pieces of setting information of the driver that are set in the server PC are applied to each client PC by writing the pieces of setting information that the application uses onto a predetermined storage region of the client PC, and, when a software such as a printer driver is added, a work load of the setting process of the software that cooperates with the added software is reduced.

SUMMARY OF THE INVENTION

However, in a case when the pieces of setting information need to be inputted each time the function is conducted and there is a plurality of information processing devices that the user uses, since the setting needs to be similarly applied to each of these information processing devices, the work load of an operation of the user to conduct an input operation of the pieces of setting information is increased.

Further, even when the collective setting information, in which a plurality of pieces of setting information that the user usually uses are collected together, can be saved, since the user needs to similarly set each of the plurality of information processing devices and then save as the collective setting information, the work load of the user of the input operation of the pieces of setting information is increased.

Still further, when the pieces of setting information of the driver set in the server PC are applied to each client PC, although the pieces of setting information can be shared in a plurality of client PCs, the pieces of setting information that are set in the client PC individually may be replaced with the pieces of setting information that are set in the server PC. Besides, when it is not intended that the pieces of setting information are shared in the client PC, the pieces of setting information set in the server PC may be delivered to the client PC and the pieces of setting information of the client PC may be automatically changed to the pieces of setting information that the user of the client PC does not intend.

According to the above, this disclosure is conducted by taking the above-described circumstances into consideration, and the object of this disclosure is to provide a setting information management system that can deliver sharing setting information that is used in a plurality of information processing devices to each of the information processing device as needed and update, etc. the sharing setting information when the update, etc. is needed, and is capable of reducing an operation work load of the user of an input operation of the pieces of setting information.

This disclosure provides a setting information management method of a setting information management system that manages setting information about a function of an image forming device that is conducted in an information processing device, wherein the method including: saving in which setting contents of a plurality of setting items about a function of the image forming device are saved; saving of setting information in which collective setting information including setting contents that are respectively set for the plurality of setting item is saved; deciding of sharing setting in which the plurality of setting items include information of collective setting sharing that decides whether saved collective setting information is commonly used in a plurality of information processing devices or not, and whether it is enabled that the collective setting information is commonly used in a plurality of information processing devices or not is decided by the information of collective setting sharing; delivering of setting information in which, when it is decided in the deciding of sharing setting that it is enabled that the collective setting information is commonly used in a plurality of information processing devices, saved collective setting information is delivered to the plurality of information processing devices; and acquiring of setting information in which collective setting information delivered to the information processing device is acquired and saved as sharing setting information; wherein, when it is enabled in the information of collective setting sharing that the collective setting information is commonly used in the plurality of information processing devices, the collective setting information is commonly used in a plurality of information processing devices.

Further, in the setting information management method: in a case in which it is set in the information of collective setting sharing that it is enabled that the collective setting information is commonly used in the plurality of information processing devices, when new collective setting information is added and saved in saving of the setting information, the added and saved collective setting information is delivered to the plurality of information processing devices in the delivering of setting information.

Further, the setting information management method further includes: requesting of erasing setting information in which when, in a state in which it is set in the information of collective setting sharing that it is enable that the collective setting information is commonly used in a plurality of information processing devices, the information of collective setting sharing is changed so that it is disabled that the collective setting information is commonly used in a plurality of information processing devices, a collective setting information erasing request that requests to information processing devices in which the collective setting information is shared for erasing all pieces of collective setting information is transmitted; and erasing of all pieces of sharing setting information saved in the information processing device when the information processing device receives the collective setting information erasing request.

Further, the setting information management method further includes: erasing in which, when collective setting information saved in the saving is erased, in the requesting of erasing setting information, an erasing request that requests to an information processing device in which the erased collective setting information is shared for erasing the erased collective setting information is transmitted, and when the information processing device receives the erasing request, sharing setting information corresponding to the erased collective setting information among pieces of sharing setting information saved in the information processing device is erased.

Further, the setting information management method further includes receiving of setting information request in which a setting information request transmitted from the information processing device is received; wherein when the setting information request is received in the receiving of setting information request, collective setting information that is saved in the saving is delivered to the information processing device that is the transmission source of the setting information request in the delivering of setting information.

Further, in the setting information management method: when the collective setting information is saved in the saving of setting information, the collective setting information and date information about when the corresponding collective setting information is saved are saved in association with each other; when sharing setting information saved in the information processing device is also saved in association with sharing setting date information that is date information about when collective setting information corresponding to this sharing setting information is saved, and when newest date information about when collective setting information corresponding to the sharing setting information is saved includes a date newer than that of the sharing setting date information, collective setting information that is saved on the newest date is delivered to an information processing device in the delivering of setting information and sharing setting information saved in the information processing device is updated to the delivered collective setting information.

Further, the setting information management method further includes: requesting of date information in which the information processing device requests transmitting newest date information about when collective setting information corresponding to sharing setting information that is saved in the information processing device; acquiring of date information in which saving date information that is the newest date information is acquired; deciding of sharing setting date in which the acquired saving date information and sharing setting date information saved in association with the sharing setting information are compared with each other; and requesting of setting information in which, when the saving date information includes a date newer than that of the sharing setting date information, transmitting the collective setting information corresponding to the sharing setting information is requested; wherein, in the delivering of setting information, collective setting information saved on the requested newest date is delivered to an information processing device.

Further, in the setting information management method: when sharing setting information saved in the information processing device is not saved in association with the sharing setting date information, in the delivering of setting information, collective setting information corresponding to the sharing setting information in which the corresponding collective setting information includes newest date information about when the corresponding collective setting information is saved is delivered to the information processing device.

Further, the setting information management method further includes saving of inherent setting information in which the information processing device saves inherent setting information including setting contents that are used only in this information processing device and are respectively set for a plurality of setting items about a predetermined function, the inherent setting information can be added only in an information processing device in which this inherent setting information is saved and can be erased only by an erasing request that is conducted in an information processing device in which this inherent setting information is added.

Further, in the setting information management method: in the saving of setting information, when the collective setting information is saved, a predetermined name is applied to the collective setting information and the collective setting information is saved; further, when new collective setting information is added and saved, a name different from a name of already saved collective setting information is applied to the new collective setting information and the new collective setting information is saved; and when new collective setting information is to be saved with a name of already saved collective setting information, an update warning screen that indicates that collective setting information is to be rewritten and updated is displayed.

Further, in the setting information management method: the collective setting information is information that includes setting contents that are respectively set for a plurality of setting items about a printing function conducted by an image forming device; and information of collective setting sharing is information of print setting sharing that decides whether collective setting information about the printing function is commonly used in the plurality of information processing devices or not.

Further, the setting information management method further including: operating in which whether it is enabled that the collective setting information is commonly used in the plurality of information processing devices or not is set in the information of collective setting sharing.

Further, this disclosure provides a setting management device that saves collective setting information that is commonly used and is connected via a network to an information processing device that uses the collective setting information to make an image forming device conduct its function, wherein the setting management device including: a storage in which setting contents of a plurality of setting items about a function of an image forming device are saved; a setting information saver that saves the collective setting information including setting contents that are respectively set for the plurality of setting items in the storage; a sharing setting decider in which the plurality of setting items include information of collective setting sharing that decides whether the saved collective setting information is commonly used in a plurality of information processing devices or not, and it is decided by the information of collective setting sharing whether it is enabled that the collective setting information is commonly used in a plurality of information processing devices or not; and a setting information deliverer that, when the sharing setting decider decides that it is enabled that the collective setting information is commonly used in a plurality of information processing devices, delivers collective setting information saved in the storage to the plurality of information processing devices; wherein, only when it is enabled in the information of collective setting sharing that the collective setting information is commonly used in a plurality of information processing devices, the collective setting information is commonly used in the setting management device and the plurality of information processing devices.

Further, this disclosure provides a setting information management system in which a setting management device that saves collective setting information that is commonly used and an information processing device that uses the collective setting information to perform a function of an image forming device are connected via a network, wherein: the setting management device including: a storage in which setting contents of a plurality of setting items about a function of an image forming device are saved; a setting information saver that saves the collective setting information including setting contents that are respectively set for the plurality of setting items in the storage; a sharing setting decider in which the plurality of setting items include information of collective setting sharing that decides whether the saved collective setting information is commonly used in a plurality of information processing devices or not, and it is decided by the information of collective setting sharing whether it is enabled that the collective setting information is commonly used in a plurality of information processing devices or not; and a setting information deliverer that, when the sharing setting decider decides that it is enabled that the collective setting information is commonly used in a plurality of information processing devices, delivers collective setting information saved in the storage to the plurality of information processing devices; wherein the information processing device includes setting information acquirer that acquirers the delivered collective setting information and saves the delivered collective setting information as sharing setting information, and when it is enabled in the information of collective setting sharing that the collective setting information is commonly used in the plurality of information processing devices, the collective setting information is commonly used in the setting management device and the plurality of information processing devices.

Further, the setting management device includes a printer driver that conducts functions of the setting information saver, the sharing setting decider, and the setting information deliverer, and the information processing device includes a printer driver that conducts a function of the setting information acquirer.

Further, this disclosure provides a printer driver of a setting management device that saves collective setting information that is commonly used and is connected via a network to an information processing device that uses the collective setting information to perform a function of an image forming device, wherein: the printer driver saves setting contents of a plurality of setting items about a function of an image forming device; saves the collective setting information including setting contents that are respectively set for the plurality of setting items; decides in which the plurality of setting items includes information of collective setting sharing that decides whether the saved collective setting information is commonly used in a plurality of information processing devices or not and it is decided by the information of collective setting sharing whether it is enabled that the collective setting information is commonly used in a plurality of information processing devices or not; and delivers, when it is decided that it is enabled that the collective setting information is commonly used in a plurality of information processing devices, the saved collective setting information to the plurality of information processing devices.

According to this disclosure, the collective setting information including setting contents that are respectively set for the plurality of setting items is saved in the storage, the plurality of setting items include information of collective setting sharing that decides whether the saved collective setting information is commonly used in a plurality of information processing devices or not, and, when it is decided by the information of the collective setting sharing that the collective setting information is commonly used in the plurality of information processing devices is enabled, the collective setting information saved in the storage is delivered to the plurality of information processing devices and the delivered collective setting information is commonly used in the setting management device and the plurality of information processing devices. Therefore, the collective setting information that is shared in the plurality of information processing devices can be delivered to each information processing device as needed, the sharing setting information can be updated, etc. when the update, etc. is needed, and the operation work load of the user of the input operation for sharing the collective setting information in the plurality of information processing devices.

BRIEF DESCRIPTION OF THE DRAWINGS

FIG. 4 is an explanation diagram of one embodiment of information saved in a storage of the setting management device of this disclosure.

FIG. 5 is an explanation diagram of one embodiment of information saved in the storage of the information processing device of this disclosure.

FIG. 6 is an explanation diagram of one embodiment of collective setting information saved in the registry of the storage of the setting management device of this disclosure.

FIG. 7 is an explanation diagram of one embodiment of collective setting information saved in the registry of the storage of the setting management device of this disclosure.

DETAILED DESCRIPTION OF THE INVENTION

Hereinafter, an embodiment of the present disclosure is described by using the drawings. Note that this disclosure is not limited by the description below.

Configuration of Setting Information Management System A setting information management system of this disclosure is a management system in which a setting management device that saves pieces of setting information commonly used in a plurality of information processing devices (hereinafter referred to as collective setting information) and an information processing device that conducts a predetermined function by using the collective setting information are connected to each other via a network.

Figure 1:
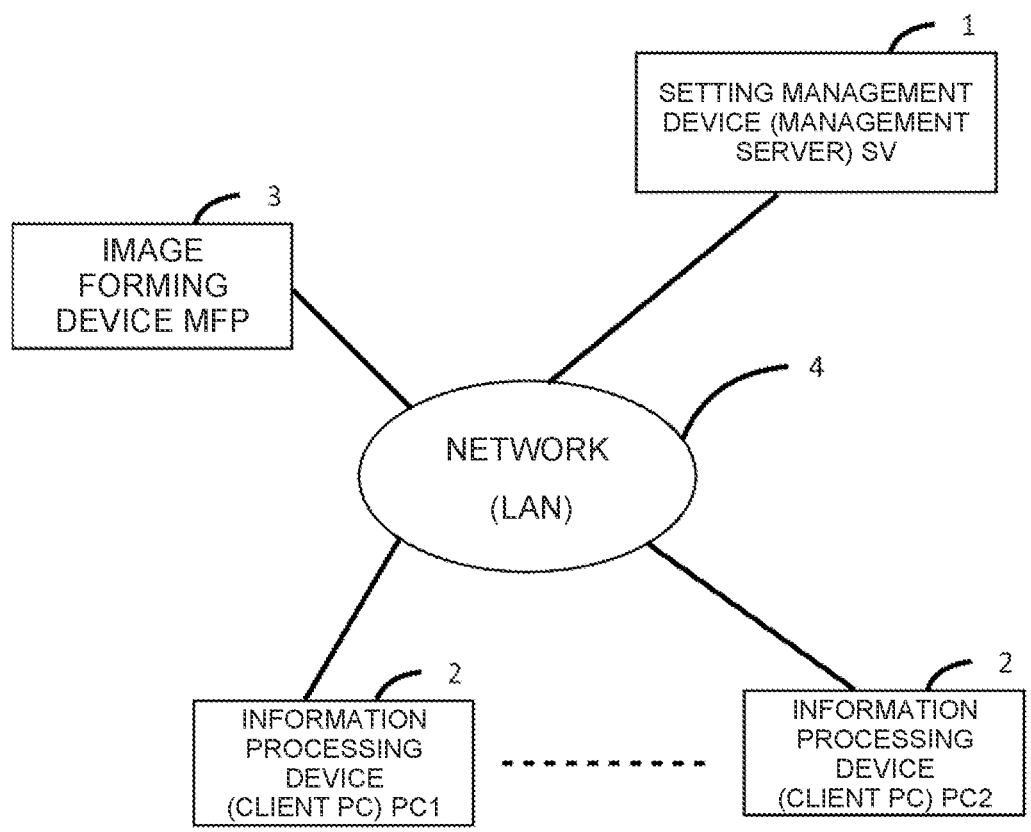
FIG. 1 is a configuration block diagram of one embodiment of a setting information management system of this disclosure.

FIG. 1 shows a schematic configuration block diagram of one embodiment of the setting information management system of this disclosure.

The setting information management system in FIG. 1 is a system that manages setting contents of a plurality of setting items that are used when a predetermined function is conducted in an image forming device, etc. and the collective setting information, and mainly configured by a setting management device 1, an information processing device 2, and an image forming device 3 that are connected to a network 4 such as the internet and a LAN, etc. The setting management device 1, the information processing device 2, and the image forming device 3 are each capable of data communication with each other via the network 4.

Further, in the setting information management system, the pieces of setting information that are commonly used in the plurality of information processing devices (collective setting information) are set and saved in the setting management device 1, and then, for example, the saved collective setting information is delivered from the setting management device 1 to the information processing device 2 according to a request from the information processing device 2.

The setting management device 1 (SV) is a device that saves the setting contents of the plurality of setting items about a predetermined function, and sets, saves, and delivers the pieces of setting information that are commonly used (collective setting information), and is also referred to as a management server, or simply referred to as a server, SV.

The information processing device 2 (PC) is a device that uses the pieces of setting information that are commonly used (collective setting information) to make the image forming device conduct a predetermined function, and is a device that sets and saves individual pieces of setting information (referred to as inherent setting information) and uses the inherent setting information to make the image forming device conduct a predetermined function, and is also referred to as a client personal computer, a client PC, or simply referred to as a personal computer, PC.

The information processing device 2 (PC) is not limited to a single device and a plurality of information processing devices 2 (PC) may be connected to the setting management device 1 and the image forming device 3 via the network 4.

Here, the commonly-used pieces of setting information (collective setting information) are information including setting contents that are respectively set for a plurality of setting items about a predetermined function, and for example, information including setting contents that are respectively set for a plurality of setting items about a printing function, etc. that is conducted by the image forming device 3.

Further, in other words, the collective setting information is information in which setting contents set and inputted for a plurality of setting items about a predetermined function are collectively saved, and is also referred to as a "favorite" in the embodiment described below.

The inherent setting information is, similarly to the collective setting information, information in which setting contents set and inputted for a plurality of setting items about a predetermined function are collectively saved. However, the inherent setting information is information that is set and saved in each information processing device 2 and is used only by the information processing device in which the inherent setting information is saved.

The inherent setting information also corresponds to the "favorite".

Note that, in the embodiment described below, although each of the setting contents of the plurality of setting items, the collective setting information, and the inherent setting information are explained with respect to a function conducted by the image forming device 3, this disclosure is not limited to the function conducted by the image forming device 3. For example, when a scanner device, an external storage device, a communication control device such as a router, and a display device are connected to the network 4 and the information processing device 2 (PC) uses these devices, pieces of setting information about functions conducted by the scanner device, etc. may be set and saved in the setting management device 1 and the information processing device 2.

Further, in this disclosure, it can be set in the setting management device 1 that "enable or disable of delivering" for deciding whether the collective setting information set and saved in the setting management device 1 is delivered to the plurality of information processing devices or not.

The setting of enable or disable of delivering means a setting of "enable or disable of setting sharing" for deciding whether the same collective setting information is used in the plurality of information processing devices or not.

In the embodiment described below, the plurality of setting items saved in the setting management device 1 includes information of collective setting sharing for deciding whether the saved collective setting information is commonly used in the plurality of information processing devices 2 or not (hereinafter simply referred to as collective setting sharing). For example, the "collective setting sharing" for setting the "enable or disable of setting sharing" of the collective setting information that is used for a function that can be conducted in the image forming device is included in the setting items of the setting management device 1.

The information of the corresponding collective setting sharing is used when a below-described sharing setting decider 22 decides whether it is enabled that the collective setting information is commonly used in the plurality of information processing devices or not.

For the "collective setting sharing", any one of "sharing" and "not sharing" is set. The information of the collective setting sharing may be set for each of functions that can be conducted and, for example, information that decides whether the collective setting information about, among a plurality of functions that can be conducted in the image forming device, a printing function is commonly used in the plurality of information processing devices or not is referred to as information of print setting sharing, or simply referred to as "print setting sharing".

When the "print setting sharing" is set as sharing, the collective setting information that is set and saved in the setting management device 1 and is used for the printing function can be delivered to the plurality of information processing devices.

On the other hand, when the "print setting sharing" is set as not sharing, the collective setting information that is set and saved in the setting management device 1 and is used for the printing function is not delivered to the plurality of information processing devices and the collective setting information that has already been delivered to the plurality of information processing devices may be erased.

The image forming device 3 (MFP: Multifunction Peripheral) is a device that processes image data and conducts inputting, forming, outputting, saving, and forwarding, etc. of the image data.

The image forming device 3 is also referred to as a multi-function peripheral, or simply as an MFP.

A user who intends to make the image forming device 3 conduct a predetermined function conducts an input operation using an operation key provided to the image forming device 3 to make the image forming device 3 conduct the predetermined function.

Further, the user can transmit information such as a printing request from the information processing device 2 to the image forming device 3 and make the image forming device 3 conduct the function by remote control from the information processing device 2 via the network 4.

The image forming device 3 (MFP) is not limited to a single device and a plurality of image forming devices 3 (MFP) can be connected to the setting management device 1 and the information processing device 2 via the network 4.

Figure 2:
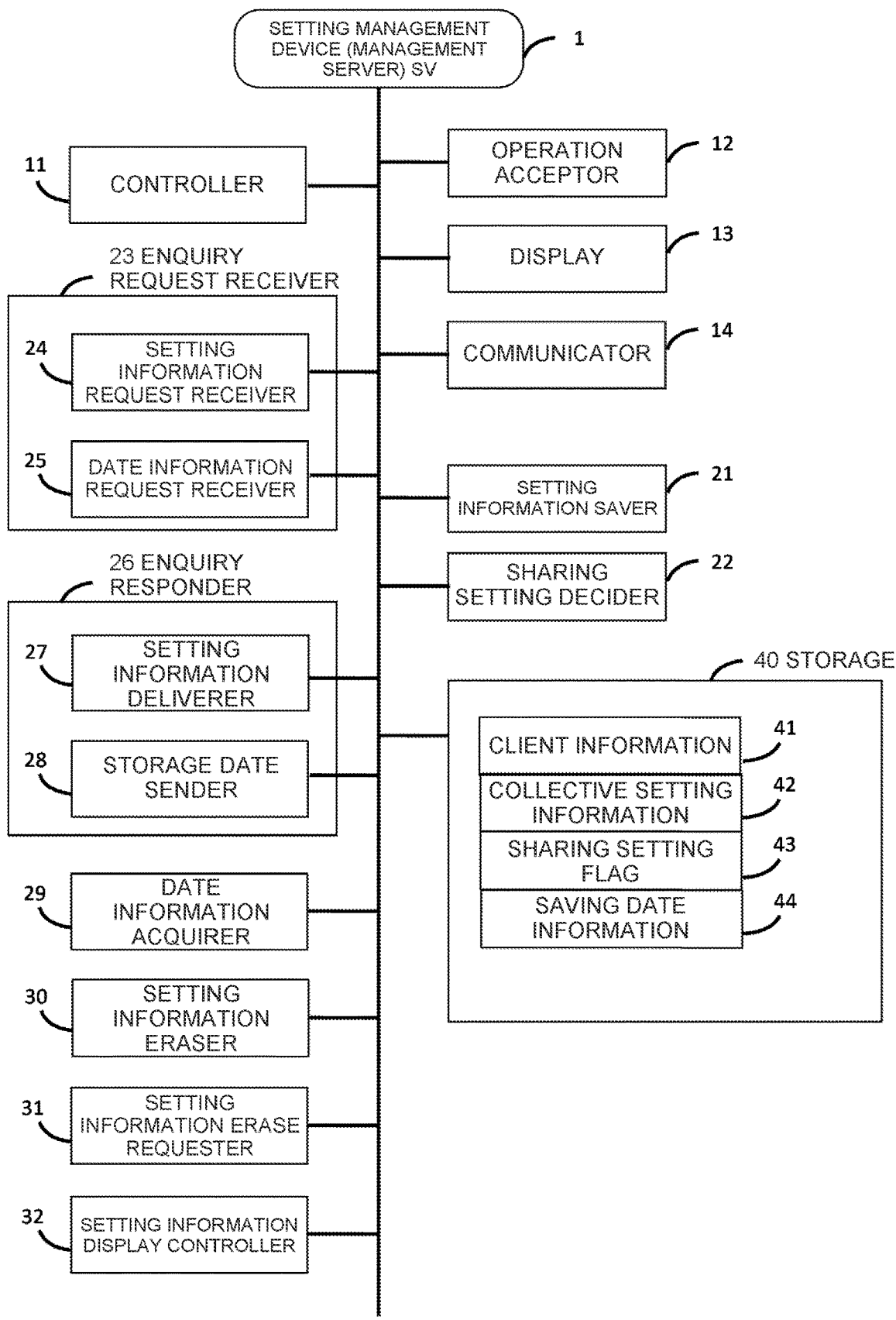
FIG. 2 is a configuration block diagram of one embodiment of a setting management device of this disclosure.

Configuration of Setting Management Device (Management Server) FIG. 2 shows a configuration block diagram of one embodiment of the setting management device (management server) of this disclosure.

In FIG. 2, the setting management device (SV) 1 of this disclosure mainly includes a controller 11, an operation acceptor 12, a display 13, a communicator 14, a setting information saver 21, a sharing setting decider 22, an enquiry request receiver 23, a setting information request receiver 24, a date information request receiver 25, an enquiry responder 26, a setting information deliverer 27, a saving date transmitter 28, a date information acquirer 29, a setting information eraser 30, a setting information erase requester 31, a setting information display controller 32, and a storage 40.

The controller 11 is a part that controls an action of each component such as the operation acceptor and the display, etc. and is realized by a micro-computer mainly including a CPU, a ROM, a RAM, an I/O controller, and a timer, etc.

The CPU organically activates a variety of hardware based on a control program previously stored in a nonvolatile memory such as a ROM to conduct a setting information saving function and a setting information delivering function, etc. in the management server SV.

Further, among the above-described components, the setting information saver 21, the sharing setting decider 22, the date information acquirer 29, and the setting information eraser 30, etc. are function blocks in which the CPU conducts respective processes based on a predetermined program.

The operation acceptor 12 is an input device in which a management person, etc. of the management server SV conducts a predetermined input operation. For example, the operation acceptor 12 is a part in which information such as a character is inputted and a function is selected and inputted, and a keyboard, a mouse, and a touch panel, etc. are used as the operation acceptor 12.

Keys that the management person operates include an action start key, a function selection key, a setting key, etc.

For example, the management person conducts an input operation via a touch panel and a predetermined setting key to select and input the setting contents of the setting items about the printing function of the image forming device MFP.

In another case, when it is intended that the collective setting information is saved in the storage 40, the setting contents of predetermined setting items are selected and inputted, and then, a name that specify the collective setting information is applied and an input operation corresponding to saving is conducted.

Further, in this disclosure, the operation acceptor 12 includes a sharing setter that sets, in the information of the above-described collective setting sharing, whether it is enabled that the collective setting information is commonly used in the plurality of information processing devices or not.

The sharing setter may be, for example, an exclusive key that sets the information of the collective setting sharing, or may be a display region in which the information of the collective setting sharing is displayed on the display 13 so as to be selectable.

The display 13 is a part that displays information, and displays to inform the management person about information that is needed for conducting each function and a result of conducting the function. For example, an LCD and an organic EL display, etc. are used as the display 13. When a touch panel is used as the operation acceptor 12, the display 13 and the touch panel are disposed so as to overlap with each other.

For example, a function selection screen for the image forming device, a screen that displays the setting contents of the setting items about the printing function, and information that is needed to conduct a predetermined function, etc. are displayed on the display 13 using a character, a symbol, a figure, an image, an icon, an animation, and a movie, etc.

Further, in this disclosure, a setting display screen (printer driver setting screen) including below-described print setting sharing and a setting display screen (print setting screen) of the print setting items, etc. are displayed on the display 13.

In another case, when a name same as the name that is applied to the collective setting information already saved in the storage 40 is applied to another collective setting information and the corresponding collective setting information is saved in the storage 40, an update warning screen indicating that the collective setting information is to be rewritten and updated may be displayed on the display 13.

The communicator 14 is a part that conducts data communication with the information processing device PC and the image forming device MFP via the network 4.

For example, the communicator 14 receives an enquiry request transmitted from the information processing device PC.

Further, when the "print setting sharing" is set as sharing, the communicator 14 transmits the collective setting information to the information processing device PC.

Any of the existing communication networks such as the Internet and a LAN, etc. may be used as the network 4, and any one of wired communication and wireless communication may be used as a communication form of the network 4.

The setting information saver 21 is a part that, in the setting management device SV, saves the setting contents of the setting items inputted by the management person, etc. of the setting management device SV into the storage 40.

Further, the setting information saver 21 saves the collective setting information including the setting contents that are respectively set for the plurality of setting items into the storage 40.

When the collective setting information is to be saved, the setting information saver 21 applies a predetermined name to the collective setting information and saves the collective setting information into the storage 40. Further, when new collective setting information is to be added and saved, the setting information saver 21 applies a name different from that of already saved collective setting information to this new collective setting information and saves this new collective setting information into the storage 40.

Here, the name of the collective setting information is, in principle, set and inputted by the management person, etc. of the setting management device SV. However, the name may be automatically applied to the collective setting information based on a predetermined name applying standard.

Further, when collective setting information is saved in the storage 40, the setting information saver 21 may save the collective setting information and date information about when the collective setting information is saved into the storage 40 in association with each other.

When the collective setting information having a same name is updated, the collective setting information is saved in association with a date of this update, that is, the newest date information about when the collective setting information having the same name is saved.

The sharing setting decider 22 is a part that decides whether the collective setting information is shared in the plurality of information processing devices PC or not.

As described above, this decision is conducted based on whether it is enabled or not by the information of collective setting sharing that is one of the setting items that can be set in the setting management device SV that collective setting information is commonly used in the plurality of information processing devices.

For example, the sharing setting decider 22 decides whether the collective setting information about the printing function is shared in the plurality of information processing devices or not based on whether the "print setting sharing" that is one of the setting items of the printing function of the image forming device is enabled or not.

The "collective setting sharing" is not limited to the "print setting sharing" and may be provided for each of other functions (for example, a manuscript reading function, etc.) conducted by the image forming device, or may be a "collective setting sharing" corresponding to a function of a device other than the image forming device that is remotely controlled by the information processing device PC.

The "print setting sharing" is, as described below, one of the setting items of the printer driver that makes the image forming device MFP conduct the printing function. When the "print setting sharing" is set as sharing, it is decided that the collective setting information is shared. On the other hand, when the "print setting sharing" is set as not sharing, it is decided that the collective setting information is not shared.

When it is decided that the collective setting information is shared, the collective setting information can be shared in the plurality of information processing devices PC that can be connected to the setting management device SV. For example, when the setting management device SV receives a setting information request from the information processing device PC, the collective setting information is delivered from the setting management device SV to the information processing device PC.

When it is decided that the collective setting information is not shared, since the collective setting information is not shared in the plurality of information processing devices PC that can be connected to the setting management device SV, the collective setting information saved in the setting management device SV is not delivered to the information processing device PC.

Further, when the setting content of the "print setting sharing" is changed from "sharing" to "not sharing", as delivered below, an erasing request of the collective setting information may be transmitted to each of the information processing devices PC and, in each of the information processing devices PC, the collective setting information already saved in the information processing device PC may be erased.

Note that the setting content of the "print setting sharing" is saved in a below-described sharing setting flag F. When it is set that the collective setting information is shared, 2 that indicates enabled (ON) is saved in the sharing setting flag F, and when it is set that the collective setting information is not shared, 1 that indicates disabled (OFF) is saved in the sharing setting flag F.

However, when information that indicates enabled and disabled of the sharing of the collective setting information is saved in another form, for example when the collective setting information including information that indicates enabled or disabled of sharing is saved in the registry of the storage region of the setting management device SV, the setting flag F may be omitted.

The enquiry request receiver 23 is a part that receives an enquiry request transmitted from the information processing device PC.

The enquiry request from the information processing device PC includes, for example, a request of enquiring whether collective setting information is saved in the setting management device SV or not, a request of, when collective setting information is saved in the setting management device SV, delivering the collective setting information, and a request of, when collective setting information is saved in the setting management device SV, transmitting a date when the collective setting information is saved, etc.

The enquiry request receiver 23 includes the setting information request receiver 24 and the date information request receiver 25 described below.

The setting information request receiver 24 is a part that receives a setting information request transmitted from the information processing device PC.

The setting information request is information that requests, when collective setting information is saved in the setting management device SV, delivering the collective setting information to the information processing device PC.

When the setting management device SV receives the setting information request and, as described above, the setting content of the "print setting sharing" is set as sharing, below-described setting information deliverer 27 delivers the collective setting information saved in the storage 40 of the setting management device SV to the information processing device PC that is the transmission source of the setting information request.

On the other hand, when the setting management device SV receives the setting information request and the setting content of the "print setting sharing" is set as not sharing, the collective setting information that is saved in the setting management device SV is not delivered.

The date information request receiver 25 is a part that receives a date information request transmitted from the information processing device PC.

The date information request is information that, when collective setting information is saved in the setting management device SV, requests transmitting the date information about when the collective setting information is saved in the setting management device SV (saving date information) to the information processing device PC.

The date information request is transmitted and received on the assumption that, when collective setting information is saved in the setting management device SV, collective setting information including the date of saving (year, month, day, hour, minute, and second) is saved.

For example, when collective setting information is saved in the registry of the storage region of the setting management device SV, the collective setting information may be saved in a form of information in which saving date information is included in a part of the collective setting information as shown in FIG. 6 described below.

When the setting management device SV receives a date information request, a date when collective setting information saved in the setting management device SV is saved (saving date information) is read, and the below-described saving date transmitter 28 transmits the read saving date information to the information processing device PC that is the transmission source of the date information request.

The enquiry responder 26 is a part that transmits a response to an enquiry request transmitted from the information processing device PC.

The response to an enquiry request from the information processing device PC includes, for example, delivering, when collective setting information is saved, the collective setting information, and transmitting, when collective setting information is saved, a date when the collective setting information is saved, etc.

The enquiry responder 26 includes the setting information deliverer 27 and the saving date transmitter 28 described below.

The setting information deliverer 27 is a part that delivers collective setting information saved in the storage 40 of the setting management device SV to the plurality of information processing devices PC when the sharing setting decider 22 decides that it is enabled that collective setting information is commonly used in the plurality of information processing devices.

That is, collective setting information is commonly used in the setting management device SV and the plurality of information processing devices PC only when, in information of collective setting sharing, it is enabled that collective setting information is commonly used in the plurality of information processing devices.

Further, for example, when it is set in information of collective setting sharing that it is enabled that collective setting information is commonly used in the plurality of information processing devices, and new collective setting information is added and saved in the storage by the setting information saver 21, the setting information deliverer 27 delivers the added and saved collective setting information to the plurality of information processing devices PC. Further, as described above, when a setting information request is received from the information processing device PC, collective setting information saved in the storage 40 of the setting management device SV is delivered to the information processing device PC as the response to the request.

Further, it is especially assumed that, when collective setting information is saved, the collective setting information and date information about when the collective setting information is saved in the storage 40 are correlatively saved, and similarly, when sharing setting information is saved in the information processing device PC, sharing setting date information that is date information about when collective setting information corresponding to the sharing setting information is saved in the storage 40 of the setting management device SV is correlatively saved. Under this assumption, when the newest date information about when the collective setting information corresponding to the sharing setting information is saved in the storage 40 includes a date newer than that of the sharing setting date information, the setting information deliverer 27 delivers the collective setting information that is saved on the newest date to the information processing device.

In this case, the sharing setting information that is saved in the information processing device PC is updated to the delivered collective setting information.

According to the above, collective setting information saved in the setting management device SV and sharing setting information that is saved in the information processing device PC corresponding to the collective setting information can always share the newest information.

On the other hand, when sharing setting information saved in the information processing device PC is not saved in association with sharing setting date information, since date information cannot be compared, the setting information deliverer 27 deliver collective setting information corresponding to the sharing setting information in which the collective setting information includes the newest date information about when the collective setting information is saved in the storage 40 to the information processing device PC.

Also in this case, the sharing setting information saved in the information processing device PC is updated to the delivered collective setting information, and the collective setting information and the sharing setting information can always share the newest information.

The saving date transmitter 28 is a part that, when a date information request is received from the information processing device PC, transmits saving date information of collective setting information that is saved in the setting management device SV to the information processing device PC as a response to this date information request.

When one piece collective setting information is saved in the setting management device SV, date information about when the collective setting information is saved may be transmitted. However, when a plurality of pieces of collective setting information is saved, each saving date information of all of the pieces of collective setting information is correlated with the information specifying each collective setting information and is transmitted.

In another case, when a received date information request includes information specifying the collective setting information, only the date information about when the collective setting information specified in the date information request is saved may be transmitted.

The date information acquirer 29 is a part that, when the collective setting information is to be saved, acquires the current date (for example, year, month, day, hour, minute, and second) from a clock function included in the setting management device SV. The acquired date is correlated with collective setting information that is to be saved and is saved as saving date information.

The setting information eraser 30 is a part that erases collective setting information saved in the storage 40 of the setting management device SV.

For example, when an input operation that means erasing of collective setting information is conducted by the management person of the setting management device SV, the setting information eraser 30 erases collective setting information saved in the storage 40.

Further, when the collective setting information is erased in the setting management device SV, since collective setting information that is to be shared does not exist, it is preferable that the erased collective setting information saved in the information processing device PC is also erased.

The setting information erase requester 31 is a part that transmits an erasing request of collective setting information to the information processing device PC.

For example, when collective setting information saved in the storage 40 is erased in the setting management device SV, the setting information erase requester 31 transmits an erasing request that requests erasing of the erased collective setting information to the information processing device PC in which the erased collective setting information is shared. When the information processing device PC receives the erasing request, sharing setting information corresponding to the erased collective setting information in pieces of sharing setting information saved in the storage 90 of the information processing device PC is erased.

Further, when, in a state in which, in the setting management device SV, it is set in the "collective setting sharing" that it is enabled that collective setting information is commonly used in the plurality of information processing devices, information of the collective setting sharing is changed to disable that collective setting information is commonly used in the plurality of information processing devices, the setting management device SV transmits a collective setting information erasing request for requesting erasing of all pieces of collective setting information to the information processing device in which the collective setting information is shared.

When the information processing device PC receives the collective setting information erasing request, all pieces of sharing setting information saved in the storage 90 of the information processing device PC are erased.

The setting information display controller 32 is a part that controls displaying of a screen about pieces of setting information displayed on the display 13.

For example, when the management person conducts a predetermined input operation to change contents of setting items for conducting a predetermined function of the image forming device, the setting items are displayed in a list form on the display 13.

Figure 29:
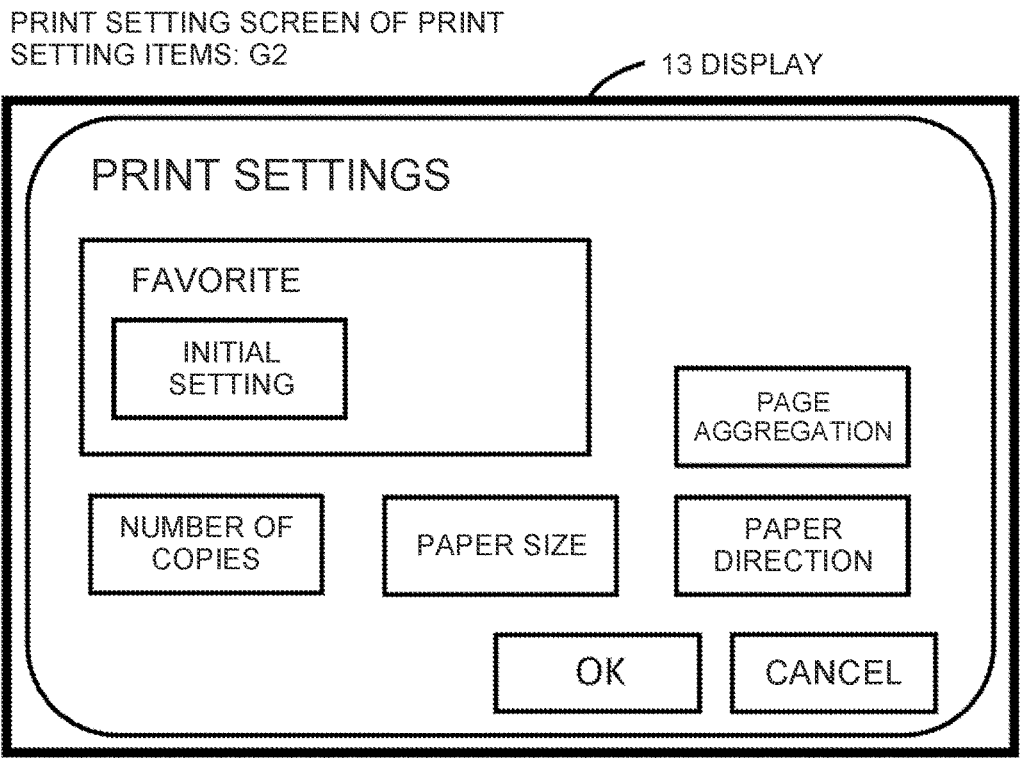
FIG. 29 is an explanation diagram of one embodiment of a setting display screen (print setting screen) including print setting items in the setting management device of this disclosure.

Further, when setting items of the printing function of the image forming device are to be checked or changed, a display screen including the setting items of the printer driver of the image forming device as shown in FIG. 29 described below (printer driver setting screen) is displayed.

Further, when setting contents of a plurality of print setting items for conducting the printing function, and collective setting information (favorite) are to be added or erased, a display screen including a default setting of the collective setting information (favorite), etc. as shown in FIG. 29 described below (print setting screen of the print setting items) is displayed.

Figure 33:
FIG. 33 is an explanation diagram of one embodiment of an update warning screen of pieces of setting information in the setting management device of this disclosure.

In another case, when collective setting information (favorite) is to be updated, that is, when collective setting information (favorite) is to be saved with a name that is same as the name of collective setting information already saved, the update warning screen as shown in FIG. 33 described below is displayed.

The storage 40 is a part that saves information and programs that are needed to conduct each function of the setting management device SV in this disclosure, and a semiconductor storage element such as a ROM, a RAM, and a flash memory, etc., a storage device such as an HDD and a SSD, etc., and another storage medium are used as the storage 40.

The storage 40 saves, for example, client information 41, collective setting information 42, a sharing setting flag 43, and saving date information 44, etc.

The client information 41 is information about the information processing device PC that can be connected to the setting management device SV, and is previously set and saved. The client information 41 includes, for example, a name, a product number, an IP address, and information needed for connection (authentication number ID, password PW), etc. of the information processing device PC.

As described above, the collective setting information 42 is information in which setting contents set and inputted for a plurality of setting items about a predetermined function are collectively saved, and is setting information that is commonly used in the plurality of information processing devices PC.

For example, the collective setting information 42 is setting information about a printing function, and is information including setting contents that are respectively set for a plurality of setting items about the printing function that is to be conducted by the image forming device.

Further, in this case, information of collective setting sharing is information of print setting sharing that decides whether the collective setting information about the printing function is commonly used in the plurality of information processing devices or not.

For example, when a plurality of setting items about the printing function includes items of a number of copies, a paper size, a paper direction, a page aggregation, and a double-side printing, and the setting contents in which the number of copies is set as "1", the paper size is set as "A4", the paper direction is set as "longitudinal", the page aggregation is set as "none", and the double-side printing is set as "none", are saved, the information including all of the setting contents saved for these plurality of setting items is the collective setting information 42.

A plurality of pieces of collective setting information can be saved as the collective setting information 42 (SD) and the pieces of collective setting information are named differently from each other so that each collective setting information can be identified. FIG. 4 shows an explanation diagram of one embodiment of information (collective setting information 42 (SD)) saved in the storage 40 of the setting management device.

In the collective setting information 42 (SD) in FIG. 4, there is shown collective setting information including a setting information name (NO), a function item name (FC), a capability of sharing (F), saving date information (SVDT), and setting contents (SET). Here, the capability of sharing (F) is information that corresponds to the current setting content of the "print setting sharing" and is a setting content of the sharing setting flag F. Further, as described above, the setting contents (SET) include, for example, setting contents saved for the five setting items of the printing function.

Five different pieces of collective setting information 42 (SD) are shown in FIG. 4. For example, in the first collective setting information 42 (SD) in FIG. 4, there are correlatively saved that the setting information name NO is "S_001", the function name FC is "FC01", the capability of sharing F is "2 (enabled)", the saving date information SVDT is "DT001", and the settings SET is "SET01".

A date such as 4/20/2022, 12:34:50 is saved in the "DT001", and information corresponding to the setting contents including the number of copies of "1", the paper size of "A4", the paper direction of "longitudinal", the page aggregation of "none", and the double-side printing of "none", is saved in the "SET01".

Further, since the "print setting sharing" is set as enabled in this first collective setting information SD, the corresponding collective setting information SD is information that can be delivered to the information processing device PC.

Similarly, in the second collective setting information SD, there are correlatively saved that the setting information name NO is "S_002", the function name FC is "FC02", the capability of sharing F is "2 (enabled)", the saving date information SVDT is "DT002", and the settings SET is "SET02".

Similarly, in the third to fifth pieces of collective setting information SD, there are correlatively saved the pieces of information such as the setting information name (NO) and the function item name (FC), etc.

In the pieces of collective setting information SD in FIG. 4, the capability of sharing F can be set in each of the pieces of collective setting information SD. The capability of sharing F is set as "2 (enabled)" in the first to fourth pieces of collective setting information SD. However, the capability of sharing F is set as "1 (disabled)" in the fifth collective setting information SD.

In this case, the first to fourth pieces of collective setting information SD are delivered to and shared in the information processing device PC. However, the fifth collective setting information SD is neither delivered to nor shared in the information processing device PC. Note that the "print setting sharing" may not be set in each of the pieces of collective setting information SD, and the same setting of the "print setting sharing" may be applied to all pieces of collective setting information SD saved in the setting management device SV.

Further, the collective setting information SD is not limited to the information described above, and another information may be added to the collective setting information SD and the collective setting information SD may be saved in another description form.

For example, when saving date information is not managed, saving date information may not be saved.

When saving date information is managed and the collective setting information SD saved in the information processing device PC is updated to include the newest information by using the saving date information, saving date information may be saved.

Further, a date when collective setting information SD is delivered to the information processing device PC and information of the information processing device PC to which the collective setting information SD is delivered may be included in the collective setting information SD in FIG. 4.

By saving these pieces of information described above, when the collective setting information SD is delivered and to which information processing device PC the collective setting information SD is delivered can be managed.

Further, as already explained, the contents of the collective setting information 42 may be configured in the form that can be saved in the registry of the storage 40 and the collective setting information 42 may be saved in the registry in this form.

FIG. 6 and FIG. 7 each shows an explanation diagram of one embodiment of collective setting information saved in the registry of the storage 40 of the setting management device of this disclosure.

FIG. 6 is an explanation diagram of one embodiment of collective setting information SD saved in the registry when the "print setting sharing" is set as enabled (sharing setting flag F is 2).

FIG. 7 is an explanation diagram of one embodiment of collective setting information SD saved in the registry when the "print setting sharing" is set as disabled (sharing setting flag F is 1).

In the registry in FIG. 6, the information in a row having a name that is started by "share_daytime_func" corresponds to the collective setting information SD in this disclosure. The collective setting information SD saved in the registry is written in a form corresponding to the description form of the registry and is saved in a state in which the name, the kind, and the data are correlated with each other.

Further, the data is composed of "2" that is a setting value of the sharing setting flag F, the saving date information, and the function name.

In the registry in FIG. 6, for example, the collective setting information SD having a name "share_daytime_func_carbon_copy" includes the kind of "REG_SZ", the data of "2,20211222165701,carbon_copy", the setting value of the sharing setting flag F of "2", the saving date information of "20211222165701" (the year of 2021, the month of 12, the day of 22, the hour of 16, the minute of 57, and the second of 01), and the function name of "carbon_copy". Since the setting value of the sharing setting flag F is "2" in the corresponding collective setting information SD, the "print setting sharing" is enabled and the corresponding collective setting information SD is information that can be delivered to the information processing device PC.

Similarly, in another collective setting information SD having a name started by "share_daytime_func" that is saved in the registry in FIG. 6, since the setting value of the sharing setting flag F is "2", the "print setting sharing" is enabled and the corresponding collective setting information SD is information that can be delivered to the information processing device PC.

Also in the registry in FIG. 7, the information in a row having a name that is started by "share_daytime_func" corresponds to the collective setting information SD in this disclosure.

Although these pieces of collective setting information SD in FIG. 7 have similar configuration to that of the pieces of collective setting information SD in FIG. 6, the part of the function name is omitted.

Further, in these pieces of collective setting information SD in FIG. 7, since the "print setting sharing" is disabled (sharing setting flag F is 1), the setting value of the sharing setting flag F in the data is set as "1".

In these pieces of collective setting information SD in FIG. 7, since the setting value of the sharing setting flag F is "1", the "print setting sharing" is disabled and the collective setting information SD is not delivered to the information processing device PC and is not shared in the information processing device PC.

The sharing setting flag 43 (F) is information that indicates enabled or disabled of the "print setting sharing".

As shown in FIG. 4, when the sharing setting flag 43 (F) is "1", it is indicated that the "print setting sharing" is disabled, that is, the collective setting information SD is not shared in the information processing device PC.

On the other hand, when the sharing setting flag 43 (F) is "2", it is indicated that the "print setting sharing" is enabled, that is, the collective setting information SD is shared in the information processing device PC.

As described above, the saving date information 44 is the date when the collective setting information SD is saved in the setting management device SV (SVDT).

Configuration of Information Processing Device (Client PC)

Figure 3:
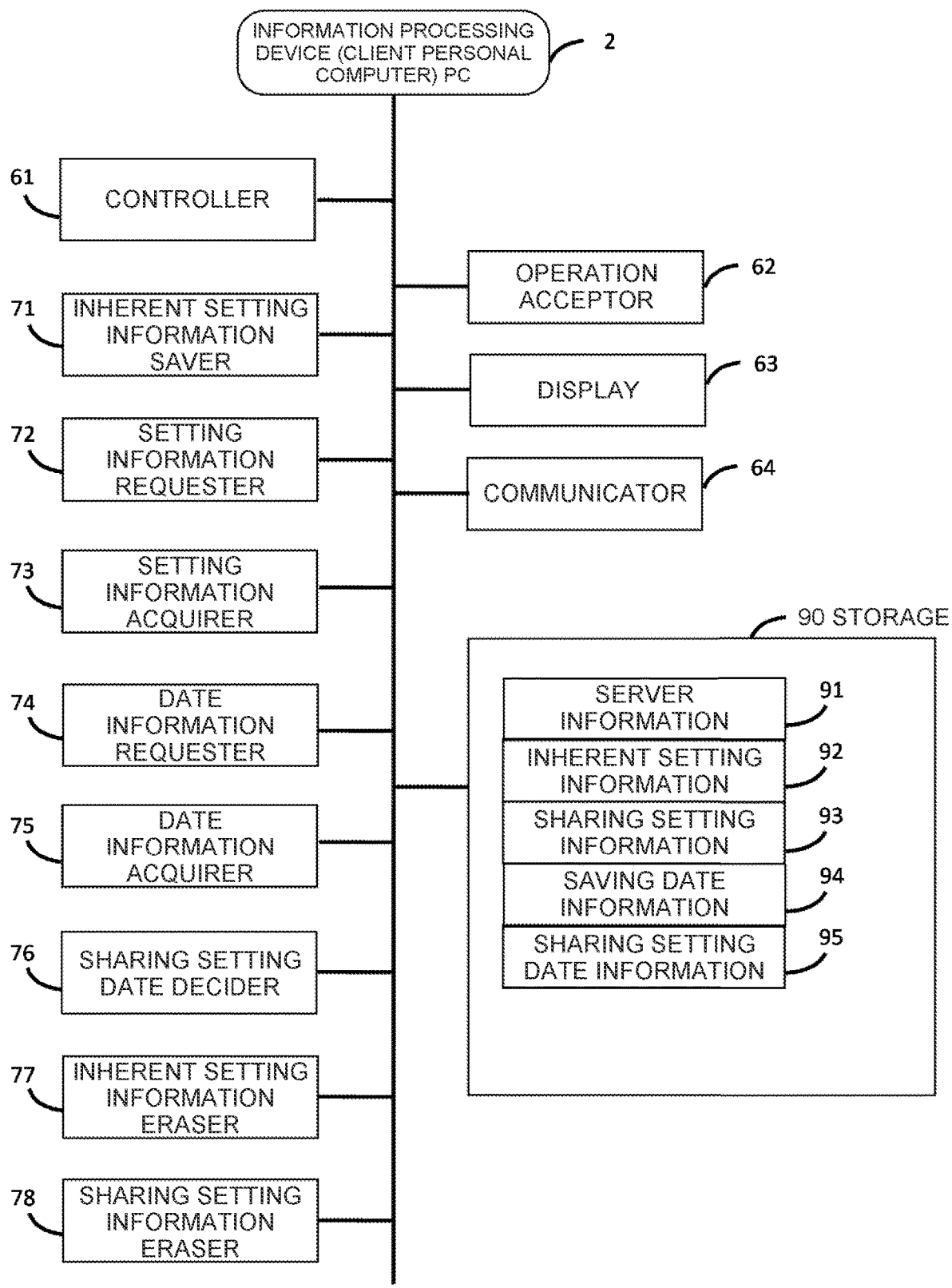
FIG. 3 is a configuration block diagram of one embodiment of the information processing device of this disclosure.

FIG. 3 shows a configuration block diagram of one embodiment of the information processing device of this disclosure. The information processing device 2 (PC) is a device that makes the image forming device MFP conduct a predetermined function via the network 4, and corresponds to an electronic apparatus that is owned by the user of the image forming device MFP.

For example, the user selects and inputs the setting contents of the setting items about a function that the user intends to make the image forming device MFP conduct, transmits a predetermined image data to the image forming device MFP, and makes the image forming device MFP conducts the copying function, the printing function, and the manuscript reading (scanning) function, etc.

Further, in this disclosure, the information processing device 2 (PC) receives collective setting information SD transmitted by the management server SV and makes the image forming device MFP conduct a predetermined function by using the corresponding collective setting information SD.

In another case, the user sets and inputs individual pieces of setting information in the information processing device 2 (PC), saves these individual pieces of setting information as the inherent setting information, and makes the image forming device MFP conduct a predetermined function by using the inherent setting information.

In FIG. 3, the information processing device 2 (PC) of this disclosure mainly includes a controller 61, an operation acceptor 62, a display 63, a communicator 64, an inherent setting information saver 71, a setting information requester 72, a setting information acquirer 73, a date information requester 74, a date information acquirer 75, a sharing setting date decider 76, an inherent setting information eraser 77, a sharing setting information eraser 78, and a storage 90.

The controller 61 is a part that controls an action of each component such as the display 63 and the communicator 64, etc. and is realized by a micro-computer mainly including a CPU, a ROM, a RAM, an I/O controller, and a timer, etc. The CPU organically activates a variety of hardware based on a control program previously saved in a nonvolatile memory such as a ROM to conduct an inherent setting information saving function and a setting information acquiring function, etc. of the information processing device PC.

Further, in the above-described components, the inherent setting information saver 71, the sharing setting date decider 76, the inherent setting information eraser 77, etc. are function blocks in which the CPU conducts respective processes based on a predetermined program.

The operation acceptor 62 is an input device in which the user of the information processing device 2 conducts a predetermined input operation. For example, the operation acceptor 12 is a part in which information such as a character is inputted and a function is selected and inputted, and a keyboard, a mouse, and a touch panel, etc. are used as the operation acceptor 12.

Keys that the user operates include an action start key, a function selection key, a setting key, etc.

For example, the user conducts an input operation via the touch panel and a predetermined setting key to select and input the setting contents of the setting items about a predetermined function of the image forming device.

The display 63 is a part that displays information, and displays to inform the using person about information needed for conducting each function and a result of conducting the function. For example, an LCD and an organic EL display, etc. are used as the display 63. When a touch panel is used as the operation acceptor 62, the display 63 and the touch panel are disposed so as to overlap with each other. For example, setting contents of the setting items used for printing, etc. by the image forming device, information that is needed to conduct the manuscript reading function, etc., and an operation screen of the selected function are displayed on the display 63 by using a character, a symbol, a figure, an image, an icon, an animation, and a movie, etc.

The communicator 64 is a part that conducts data communication with the management server SV and the image forming device MFP, etc. via the network 4.

The information processing device PC receives, for example, collective setting information delivered from the management server SV by the communicator 64.

In another case, the communicator 64 transmits information that requests setting information is transmitted to the management server SV, and transmits information that requests the date when the collective setting information is saved to the management server SV.

Any of the existing communication networks may be used as the connection form with the network 4, and any one of wired communication and wireless communication may be used as a communication form.

The inherent setting information saver 71 is a part that is used only in the information processing device PC and saves inherent setting information (CD) including setting contents that are respectively set for a plurality of setting items about a predetermined function. For example, when the user having the information processing device PC sets and inputs the user's individual setting contents for setting items about a predetermined function that the user conducts in the information processing device 2 (PC), information in which the individual setting contents are collectively saved is saved as the inherent setting information (CD).

Note that the inherent setting information CD is information that is used only in the information processing device PC in which this inherent setting information CD is saved, can be added only in the information processing device PC in which this inherent setting information CD is saved, and further, can be erased only by the erasing request conducted in the information processing device PC in which this inherent setting information CD is added. This inherent setting information CD is not commonly used in another information processing device PC.

The setting information requester 72 is a part that requests to the setting management device SV for delivering of setting information.

The setting information requested here means the setting information that can be shared in all information processing devices PC, and is the collective setting information SD described above.

For example, when the user conducts, in the information processing device PC, an operation for displaying the setting screen about the printing function, the setting information requester 72 transmits the setting information request that requests delivering of the collective setting information SD to the setting management device SV.

The setting screen about the printing function is, for example, the display screen as shown in FIG. 29 described below.

Further, when saving date information of collective setting information saved in the setting management device SV includes a date newer than that of sharing setting date information that is saved in association with sharing setting information saved in the information processing device PC, the setting information requester 72 requests transmitting collective setting information corresponding to the sharing setting information.

In this case, the setting information deliverer 27 of the setting management device SV delivers collective setting information saved on the requested newest date to the information processing device PC.

The setting information acquirer 73 is a part that acquirers collective setting information SD delivered from the setting management device SV and saves the collective setting information SD as sharing setting information 93 in the storage 90.

The collective setting information SD is, in principle, delivered from the setting management device SV to all information processing devices PC that can be connected to the setting management device SV, and the same collective setting information SD is saved in each of the information processing devices PC as the sharing setting information 93.

Further, when the collective setting information SD that is saved in the setting management device SV includes date information about when the collective setting information SD is saved and the collective setting information SD including the date information is delivered to the information processing device PC, the date information about when the collective setting information SD is saved in the setting management device SV is also included in the sharing setting information 93 saved in the information processing device PC.

The date information included in the sharing setting information 93 saved in this information processing device PC is referred to as sharing setting date information 95.

The sharing setting date information 95 is not a date when the sharing setting information 93 is saved in the information processing device PC, but a date when the collective setting information SD corresponding to the sharing setting information 93 is saved in the setting management device SV, and is compared with saving date information 94 described below.

The date information requester 74 is a part that requests to the setting management device SV for transmitting date information of the collective setting information SD.

Here, the date information includes a date when the collective setting information SD having a name same as that of the sharing setting information 93 saved in the information processing device PC is saved in the setting management device SV, and means the newest saving date. That is, the date information requester 74 requests to the setting management device SV for transmitting the newest date information about when the collective setting information SD having a name same as that of the sharing setting information 93 that has been saved in the information processing device PC and corresponding to this sharing setting information 93 is saved in the storage 40 of the setting management device SV (newest saving date).

Since a plurality of pieces of collective setting information SD may be saved in the setting management device SV, when only a date of particular collective setting information SD is requested, it is preferable that a date information request transmitted from the date information requester 74 includes, for example, identification information of the information processing device PC that is the transmission source of the date information request and the setting information name (NO) of the requested collective setting information SD.

When collective setting information SD saved in the setting management device SV is delivered to the information processing device PC, since collective setting information SD saved in the setting management device SV and the sharing setting information 93 delivered to and saved in the information processing device PC are generally the same unless the collective setting information SD is updated, date information about when the collective setting information SD is saved in the setting management device SV is the same as that of the sharing setting information 93.

When collective setting information SD saved in the setting management device SV and sharing setting information 93 are the same, the sharing setting information 93 does not need to be updated.

However, once collective setting information (SD-1) is delivered to the information processing device PC, and then, the same-named collective setting information may be updated in the setting management device SV, and hence, new collective setting information (SD-2) after this update may be saved in the setting management device SV.

A date when this new collective setting information (SD-2) is saved is different from a saving date of the originally saved collective setting information (SD-1).

When the same-named collective setting information (SD-1) is not updated in the setting management device SV, the collective setting information (SD-1) does not need to be delivered to the information processing device PC again.

On the other hand, when the same-named collective setting information SD is updated in the setting management device SV, it is preferable that the new collective setting information (SD-2) after the update is delivered to the information processing device PC from the view point that the collective setting information SD having the same contents is to be shared in all information processing devices PC.

According to the above, in order to check whether same-named collective setting information SD is updated in the setting management device SV or not, the setting management device SV is requested to transmit a saving date of the newest collective setting information (SD-2) currently saved in the setting management device SV.

When a saving date of the newest collective setting information SD currently saved in the setting management device SV and a saving date in the setting management device SV of sharing setting information 93 currently saved in the information processing device PC are not the same, it is preferably requested that the newest collective setting information SD is delivered to the information processing device PC.

The date information acquirer 75 is a part that acquires saving date information 94 that is the newest date information transmitted from the setting management device SV as the response to the above-described transmission request of date information and saves it in the storage 90.

As described above, the setting management device SV that is requested by the information processing device PC to transmit date information reads the newest saving date of collective setting information SD saved in the setting management device SV, and transmits the read saving date to the information processing device PC that is the request source of the transmission of the date information.

The sharing setting date decider 76 is a part that compares the saving date information 94 acquired by the date information acquirer 75 and the sharing setting date information 95 saved in association with the sharing setting information 93 saved in the information processing device PC.

By this comparison, the sharing setting date decider 76 decides whether the acquired saving date information 94 is newer than the sharing setting date information 95 of the sharing setting information 93 or not.

When the acquired saving date information 94 and the above-described sharing setting date information 95 are compared with each other and dates included in these pieces of information are the same, it is decided that the collective setting information SD is not updated.

In this case, information that requests the transmission of the collective setting information SD to the information processing device PC (setting information request) is not transmitted. In this way, wasteful communication of requesting the transmission of the same collective setting information SD can be prevented.

On the other hand, when the acquired saving date information 94 and the above-described sharing setting date information 95 are compared with each other, dates included in these pieces of information are different from each other, and the acquired saving date information 94 has a newer date, it is decided that the same-named collective setting information SD is updated and the new collective setting information SD is saved in the setting management device SV.

Therefore, when the date of the acquired saving date information 94 is newer than the date of the sharing setting date information 95, information that requests to the setting management device SV for transmitting the updated new collective setting information SD to the information processing device PC (setting information request) is transmitted.

That is, since the setting information request is transmitted to the setting management device SV only when collective setting information SD is updated to new collective setting information SD in the setting management device SV, wasteful communication can be prevented and, in each information processing device PC, collective setting information SD can be surely updated and the pieces of setting information same as that of the collective setting information saved in the setting management device SV can be shared.

The inherent setting information eraser 77 is a part that erases inherent setting information 92 saved in the information processing device PC.

For example, when the user conducts an input operation of erasing inherent setting information 92 in the information processing device PC, the inherent setting information eraser 77 erases the inherent setting information 92 saved in the storage 90 of the information processing device PC.

The information that is to be erased in the information processing device PC is limited to the inherent setting information 92 independently saved in this information processing device PC and the sharing setting information 93 delivered from the setting management device SV and saved in the information processing device PC is not erased.

Even when the input operation of erasing the sharing setting information 93 is conducted in the information processing device PC, the sharing setting information 93 saved in the information processing device PC is not erased. The sharing setting information 93 saved in the information processing device PC is erased only when an erasing request transmitted from the setting management device SV is received as delivered below.

The sharing setting information eraser 78 is a part that erases sharing setting information 93 saved in the information processing device PC.

For example, as described above, when an erasing request that requests erasing of collective setting information erased in the setting management device SV is transmitted by the setting information erase requester 31 of the setting management device SV and the information processing device PC receives this erasing request, the sharing setting information eraser 78 erases sharing setting information 93 corresponding to the erased collective setting information SD among pieces of sharing setting information saved in the storage 90 of the information processing device PC.

Further, when a collective setting information erasing request that requests erasing all pieces of collective setting information is transmitted to the information processing device PC in which the collective setting information is shared by the setting information erase requester 31 of the setting management device SV and the information processing device PC receives the corresponding collective setting information erasing request, the sharing setting information eraser 78 erases all pieces of sharing setting information 93 saved in the storage of the information processing device PC.

The storage 90 is a part that saves information and a program that are needed to conduct each function of the information processing device PC in this disclosure, and a semiconductor storage element such as a ROM, a RAM, and a flash memory, etc., a storage device such as an HDD and a SSD, etc., and another storage medium are used as the storage 90.

The storage 90 saves, for example, server information 91, the inherent setting information 92, the sharing setting information 93, saving date information 94, and the sharing setting date information 95, etc.

FIG. 5 shows an explanation diagram of one embodiment of information saved in the storage 90 of the information processing device.

The server information 91 is information about the setting management device SV that can be connected to the information processing device PC, and is previously set and saved.

The server information 91 includes, for example, a name, a product number, an IP address, and information needed for connection (authentication number ID, password PW), etc. of the setting management device SV.

As explained above, the inherent setting information 92 is information in which setting contents set and inputted for a plurality of setting items about a predetermined function are collectively saved, and corresponds to a "favorite" that is used only in the information processing device PC in which this inherent setting information 92 is set and saved.

FIG. 5 shows an explanation diagram of one embodiment of inherent setting information 92 (CD) saved in the storage 90 of the information processing device PC.

In the inherent setting information 92 (CD) in FIG. 5, there is shown inherent setting information including a setting information name (CDNO), a function item name (CDFC), saving date information (CDDT), and setting contents (CDSET).

The saving date information (CDDT) includes a date when the inherent setting information 92 (CD) is saved in the information processing device PC.

Similarly to the setting contents (SET) of the collective setting information SD, the setting contents (CDSET) include, for example, setting contents saved for the setting items about the printing function.

Note that the inherent setting information 92 (CD) does not include a capability of sharing (F) such as the capability of sharing included in collective setting information SD and is not shared in another information processing device PC.

The two different pieces of inherent setting information 92 (CD) are shown in FIG. 5. For example, in the first inherent setting information 92 (CD), there are correlatively saved that the setting information name CDNO is "C1_001", the function name CDFC is "FC11", the saving date information CDDT is "DT101", and the setting contents CDSET is "CST101". A date such as 4/30/2022, 14:56:23 is saved in "DT101", and information corresponding to the setting contents including the number of copies of "1", the paper size of "B4", the paper direction of "lateral", the page aggregation of "none", and the double-side printing of "enabled", is saved in "CST101".

Since the inherent setting information CD as described above is information that is effective in the information processing device PC in which this inherent setting information CD is saved, this inherent setting information CD can be erased by an input operation in this information processing device PC. However, this inherent setting information CD cannot be erased by an erasing request from the setting management device SV and another information processing device PC.

As described above, the sharing setting information 93 corresponds to collective setting information SD delivered from the setting management device SV.

In order to explain collective setting information SD saved in the information processing device PC differently from collective setting information SD delivered from the setting management device SV, a name of the collective setting information SD saved in the information processing device PC is changed to "sharing setting information".

FIG. 5 shows an explanation diagram of one embodiment of sharing setting information 93 (SD) saved in the storage 90 of the information processing device PC.

In the sharing setting information 93 (SD) in FIG. 5, there is shown sharing setting information including a setting information name (SDNO), a function item name (SDFC), a capability of sharing (F), sharing setting date information (PCDT), and setting contents (SET). These items respectively correspond to the setting information name (NO), the function item name (FC), the capability of sharing (F), the saving date information (SVDT), and the setting contents (SET) of the collective setting information 42 (SD) shown in FIG. 4. Therefore, a date included in the sharing setting date information (PCDT) is not a date when the sharing setting information 93 (SD) is saved in the information processing device PC but a date when the sharing setting information 93 (SD) is saved in the setting management device SV.

Note that, as described above, when the collective setting information SD is configured in the form that can be saved in the registry, the sharing setting information 93 (SD) is also configured in the form that can be saved in the registry.

The saving date information 94 is information about a date that is transmitted from the setting management device SV when the date information requester 74 transmits a date information request to the setting management device SV. The information about a date that is transmitted from the setting management device SV is date information about when collective setting information SD is saved in the setting management device SV and corresponds to the saving date information 44 (SVDT) described above.

When same-named collective setting information SD is updated a few times in the setting management device SV, since information of a date of the last update (saving date information 44 (SVDT)) is transmitted to the information processing device PC, the saving date information 94 is equal to the information of the date of the last update.

When a plurality of pieces of collective setting information SD is saved in the setting management device SV and the pieces of saving date information SVDT of all of these pieces of collective setting information SD are transmitted, each of the saving date information 94 is saved in association with the sharing setting information 93 corresponding to the collective setting information SD of this saving date information 94.

The sharing setting date information 95 means a date included in sharing setting information 93 (SD) saved in the storage 90, and corresponds to the sharing setting date information (PCDT) included in the sharing setting information 93 (SD) shown in FIG. 5.

As explained above, the sharing setting date decider 76 compares the above-described saving date information 94 and the sharing setting date information 95.

For example, as shown in FIG. 5, it is assumed that DT111 (=4/25/2022) is saved as the received saving date information 94 (SVDT), and 3/1/2022 is saved as the sharing setting date information 95 (PCDT) of the sharing setting information 93 (SD) saved in the information processing device PC. In this case, since the received saving date information 94 (SVDT) is newer than the sharing setting date information 95 (PCDT), collective setting information SD having the same name as the sharing setting information 93 is already updated in the setting management device SV. According to the above, in order to make the sharing setting information 93 (SD) correspond to the collective setting information SD after the update, the sharing setting information 93 (SD) saved in the information processing device PC is also updated.

Schematic Explanation of Setting Information Saved in the Setting Management Device and the Information Processing Device Hereinafter, there is shown one embodiment of changes in pieces of setting information saved in the setting management device and the information processing device when a saving operation of collective setting information SD in the setting management device SV and a saving operation of inherent setting information CD in the information processing device PC, etc. are conducted.

Embodiment 1 of the Setting Information: Addition of Collective Setting Information FIG. 8 shows an explanation diagram of one embodiment of pieces of setting information saved in the setting management device (server SV) and the information processing device (client personal computer).

Figure 8:
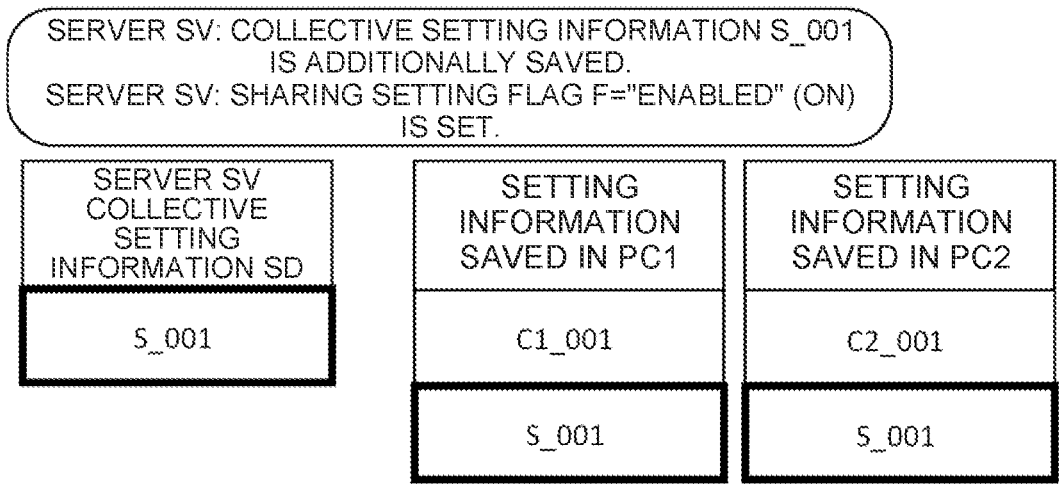
FIG. 8 is an explanation diagram of one embodiment of pieces of setting information saved in the setting management device and the information processing device of this disclosure.

FIG. 8 shows the pieces of setting information saved in the server SV and two client personal computers (PC1, PC2). Firstly, it is assumed that the inherent setting information CD is saved in each of the two client personal computers (PC1, PC2).

In this case, in FIG. 8, it is assumed that the inherent setting information C1_001 is saved in PC1 and the inherent setting information C2_001 is saved in PC2.

Next, it is assumed that the collective setting information SD having a name of S_001 is added and saved in the server SV.

Further, it is assumed that the sharing setting flag F of the server SV is set as "enabled" (ON). In this case, the collective setting information having the name of S_001 is delivered to the two client personal computers (PC1, PC2).

After delivering the collective setting information having the name of S_001, sharing setting information SD having the name of S_001 is saved in each of the two client personal computers (PC1, PC2).

That is, the added and saved collective setting information SD having the name of S_001 is shared in the setting management device SV and the two client personal computers (PC1, PC2).

Figure 14:
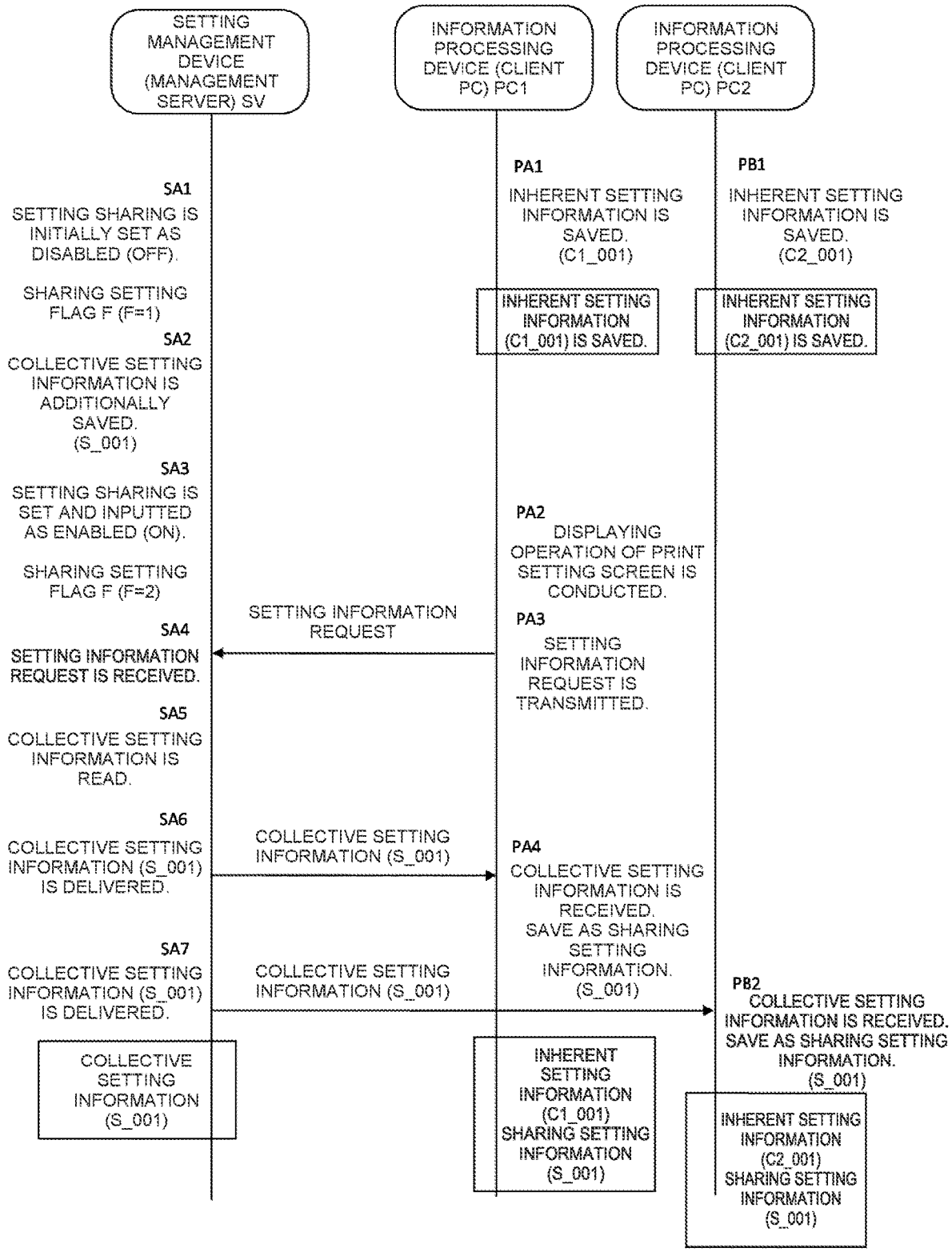
FIG. 14 is a communication sequence of one embodiment of a communication process between the setting management device and the information processing device of this disclosure.

FIG. 14 shows a communication sequence of one embodiment of a communication process between the setting management device and the information processing device.

This communication sequence corresponds to the saving state of the pieces of setting information in FIG. 8.

It is assumed that the inherent setting information CD having a name of "C1_001" is saved in a step PA1 of the information processing device PC1 in FIG. 14.

Further, it is assumed that the inherent setting information CD having a name of "C2_001" is saved in a step PB1 of the information processing device PC2 in FIG. 14.

It is assumed that the print setting sharing is initially set as disabled (OFF) in a step SA1 of the setting management device SV in FIG. 14.

In this case, "1" indicating disabled (OFF) is saved in the sharing setting flag F.

It is assumed that the collective setting information SD having a name of "S_001" is added and saved in a step SA2 of the setting management device SV.

In this case, when the collective setting information SD is saved in the form that can be saved in the registry, for example, information including "1" in the data of the collective setting information SD is saved as shown in FIG. 7.

It is assumed that the print setting sharing is set as enabled (ON) in a step SA3. In this case, the sharing setting flag F is changed to "2" indicating enabled (ON).

Further, when the collective setting information SD is saved in the form that can be saved in the registry, for example, as shown in FIG. 6, the collective setting information SD is rewritten to information including "2" in the data of the collective setting information SD.

It is assumed that, after that, the user conducts an operation of displaying a print setting screen in a step PA2 of the information processing device PC1.

In this case, a setting information request is transmitted from the information processing device PC1 to the setting management device SV in a step PA3.

The setting information request is received in a step SA4 of the setting management device SV.

Since the print setting sharing is set as enabled (ON), the collective setting information (S_001) saved in the setting management device SV is read in a step SA5. Since the print setting sharing is set as enabled (ON), the read collective setting information (S_001) is delivered to the information processing device PC1 that is the transmission source of the setting information request in a step SA6.

The collective setting information (S_001) is received in a step PA4 of the information processing device PC1.

Here, the received collective setting information (S_001) is saved as sharing setting information SD.

According to the above, the inherent setting information (C1_001) and the sharing setting information (S_001) are saved in the information processing device PC1.

When the collective setting information (S_001) is information that should be shared in all information processing devices PC that can be connected to the setting management device SV, since the collective setting information (S_001) is transmitted to one information processing device PC1, the collective setting information (S_001) may be delivered to another information processing device PC.

In this case, similarly to the step SA6, the collective setting information (S_001) is delivered to another information processing device PC2 that can be connected to the setting management device SV in a step SA7 of the setting management device SV.

The collective setting information (S_001) is received in a step PB2 of the information processing device PC2.

Here, the received collective setting information (S_001) is saved as sharing setting information SD.

According to the above, the inherent setting information (C2_001) and the sharing setting information (S_001) are saved in the information processing device PC2.

Note that the delivering of the collective setting information (S_001) to the information processing device PC2 may be conducted after a setting information request from the information processing device PC2 is received.

Figure 15:
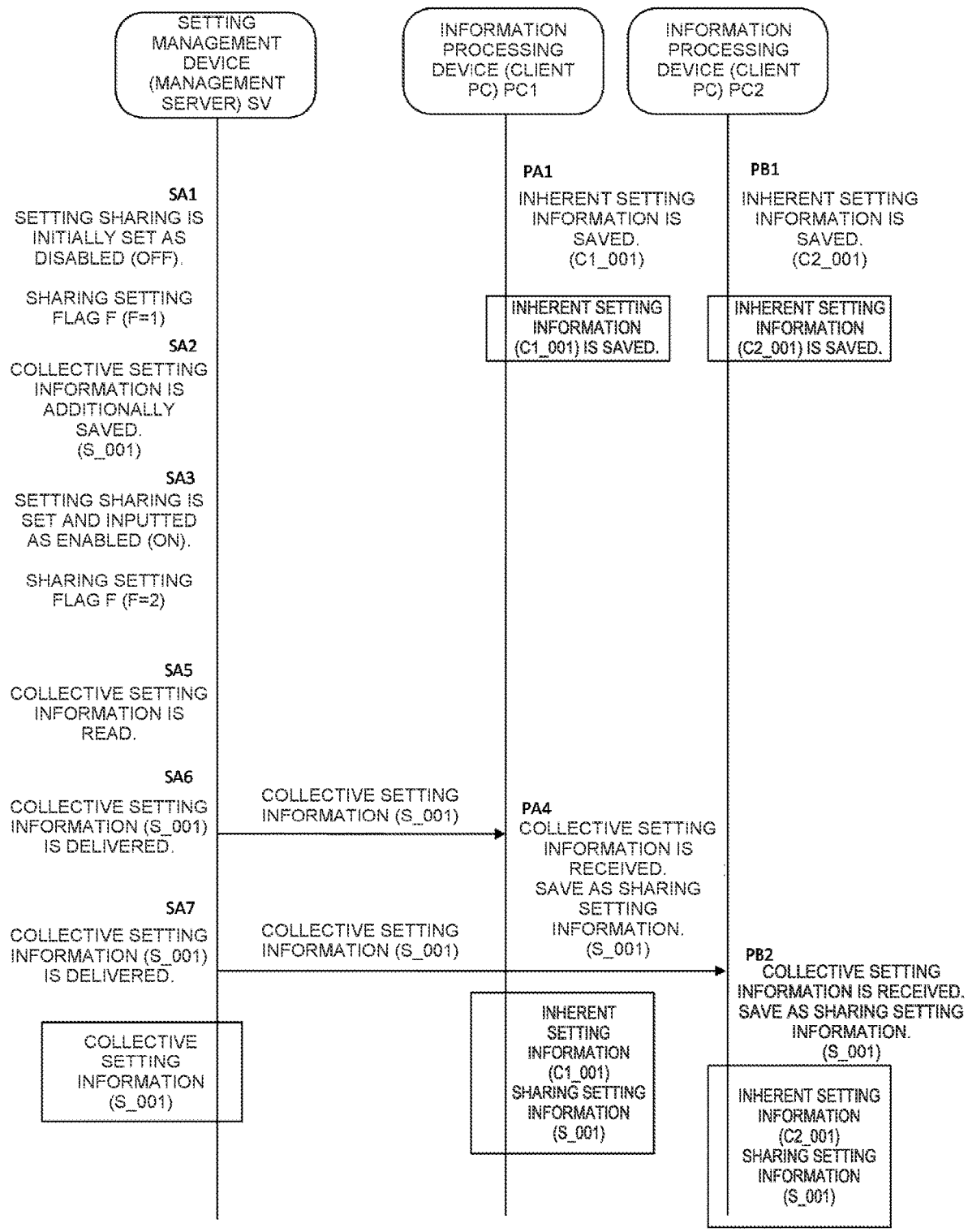
FIG. 15 is a communication sequence of one embodiment of a communication process between the setting management device and the information processing device of this disclosure.

FIG. 15 shows a communication sequence of one embodiment of a communication process between the setting management device and the information processing device. Similarly to FIG. 14, the communication sequence in FIG. 15 corresponds to the saving state of the pieces of setting information in FIG. 8. However, differently from the communication sequence in FIG. 14, FIG. 15 shows the sequence in which, when the setting information request is not received from the information processing device PC and the print setting sharing is set as enabled (ON) in the setting management device SV, the collective setting information SD saved in the setting management device SV is delivered to the information processing device PC.

Steps PA1, PB1, SA1, SA2, and SA3 in the communication sequence in FIG. 15 are the same as those in the communication sequence in FIG. 14.

Note that, since the print setting sharing is set as enabled (ON) in the step SA3, this communication sequence proceeds straightly to a step SA5 and the collective setting information (S_001) is read. The corresponding collective setting information (S_001) is delivered to the information processing device PC1 in a step SA6.

A step SA7, a step PA4, and a step PB2 thereafter are the same as those in the communication sequence in FIG. 14.

Figure 9:
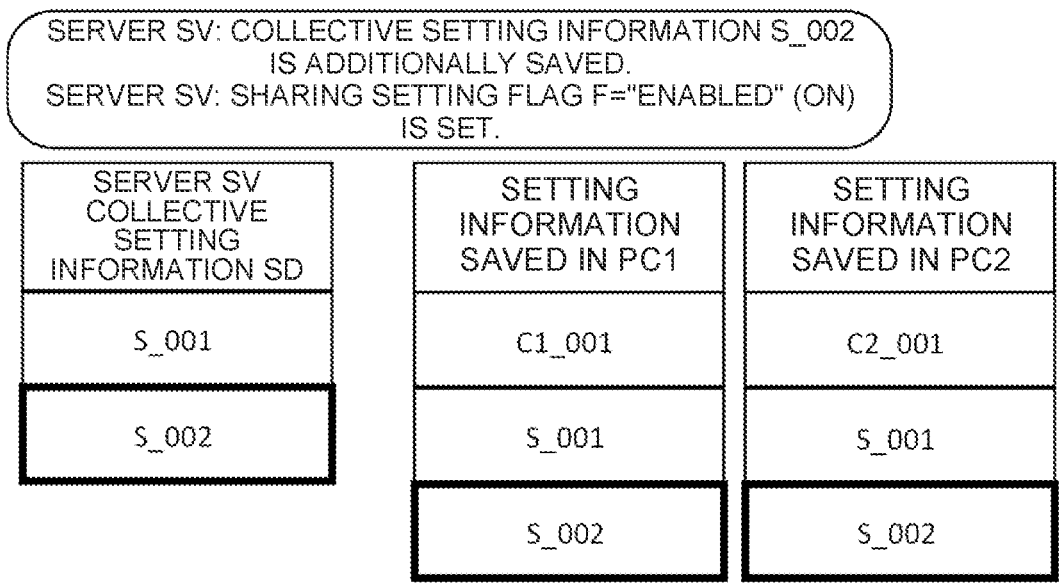
FIG. 9 is an explanation diagram of one embodiment of pieces of setting information saved in the setting management device and the information processing device of this disclosure.

Embodiment 2 of the Setting Information: Addition of the Collective Setting Information FIG. 9 shows an explanation diagram of one embodiment of pieces of setting information saved in the setting management device and the information processing device. Similarly to FIG. 8, FIG. 9 shows the pieces of setting information saved in the server SV and the two client personal computers (PC1, PC2) and the sharing setting flag F of the server SV is assumed to be set as "enabled" (ON). Further, in FIG. 9, it is assumed that, after the saving state in FIG. 8, the collective setting information SD having a name of S_002 is added and saved in the server SV.

In this case, since the sharing setting flag F in the server SV is set as "enabled" (ON), the collective setting information having the name of S_002 is delivered to the two client personal computers (PC1, PC2).

After delivering the collective setting information having the name of S_002, sharing setting information SD having the name of S_002 is added and saved in each of the two client personal computers (PC1, PC2).

That is, the two pieces of collective setting information (S_001, S_002) are shared in the setting management device SV and the two client personal computers (PC1, PC2).

Figure 16:
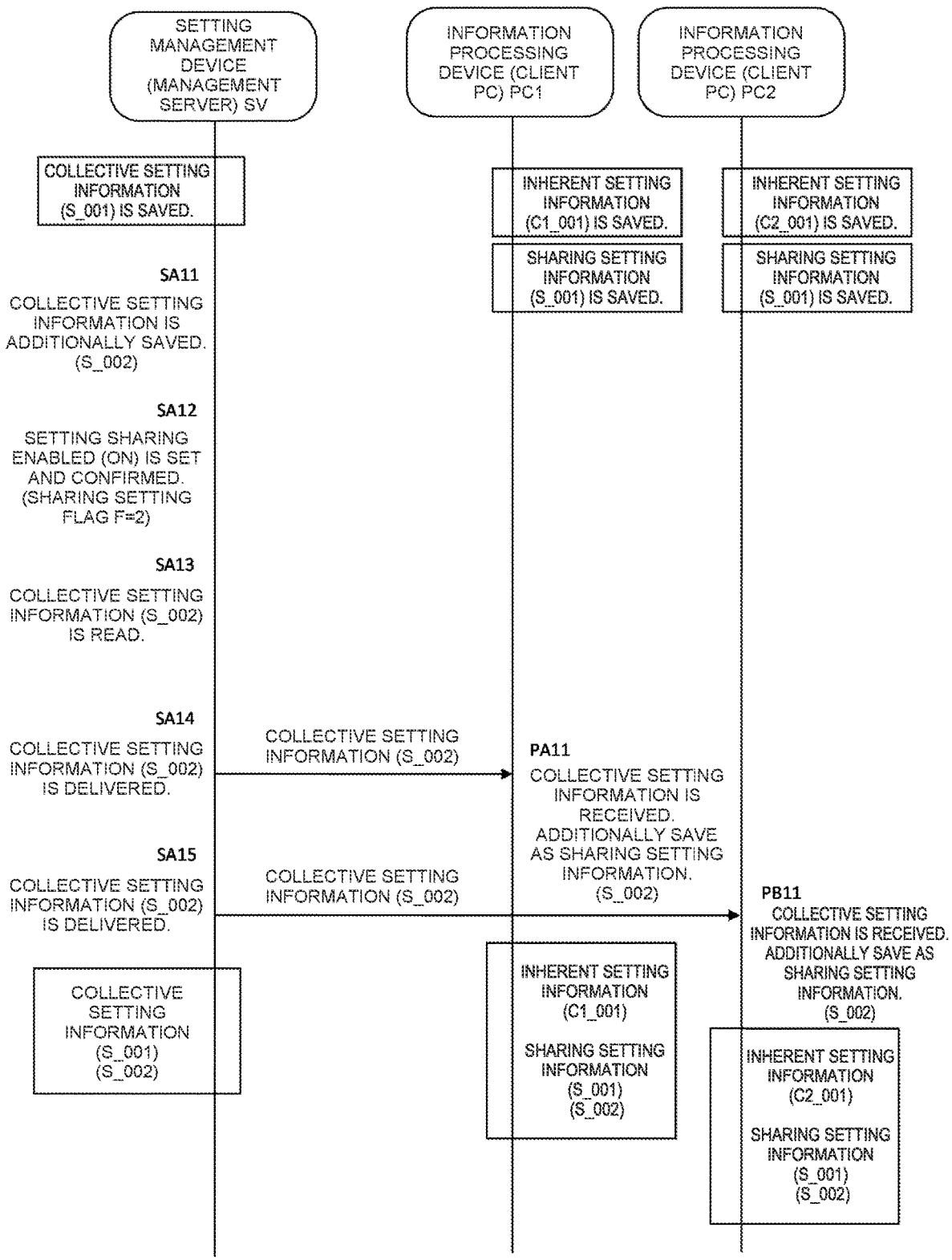
FIG. 16 is a communication sequence of one embodiment of a communication process between the setting management device and the information processing device of this disclosure.

FIG. 16 shows a communication sequence of one embodiment of a communication process between the setting management device and the information processing device.

This communication sequence corresponds to the saving state of the pieces of setting information in FIG. 9.

In the communication sequence in FIG. 16, it is assumed as the premise that collective setting information S_001 is saved in the setting management device SV, inherent setting information C1_001 and sharing setting information S_001 are saved in the information processing device PC1, and inherent setting information C2_001 and the sharing setting information S_001 are saved in the information processing device PC2.

It is assumed that collective setting information SD having a name of "S_002" is added and saved in a step SA11 of the setting management device SV in FIG. 16.

In this case, when the collective setting information SD is saved in the form that can be saved in the registry, for example, information including "2" in the data of the collective setting information SD is saved as shown in FIG. 6.

In a step SA12, whether the print setting sharing is set as enabled (ON) or not is checked.

That is, whether the sharing setting flag F is "2" that indicates enabled (ON) or not is checked. When the sharing setting flag F is "2", the communication sequence proceeds to a step SA13. Note that, when the sharing setting flag F is "1" (disabled (OFF)), the processes after the step SA12 are not conducted.

Since the print setting sharing is set as enabled (ON) in the step SA13, the collective setting information (S_002) newly added and saved in the setting management device SV is read.

In a step SA14, the read collective setting information (S_002) is delivered to the information processing device PC1.

The collective setting information (S_002) is received in a step PA11 of the information processing device PC1.

Here, the received collective setting information (S_002) is saved as sharing setting information SD.

According to the above, the inherent setting information (C1_001) and the two pieces of sharing setting information (S_001, S_002) are saved in the information processing device PC1.

Further, in a step SA15, similarly to the step SA14, the read collective setting information (S_002) is delivered to the information processing device PC2 that can be connected to the setting management device SV.

The collective setting information (S_002) is received in a step PB11 of the information processing device PC2.

Here, the received collective setting information (S_002) is saved as sharing setting information SD.

According to the above, the inherent setting information (C2_001) and the two pieces of sharing setting information (S_001, S_002) are saved in the information processing device PC2.

Embodiment 3 of the Setting Information: Addition of the Inherent Setting Information FIG. 10 shows an explanation diagram of one embodiment of pieces of setting information saved in the setting management device and the information processing device.

Figure 10:
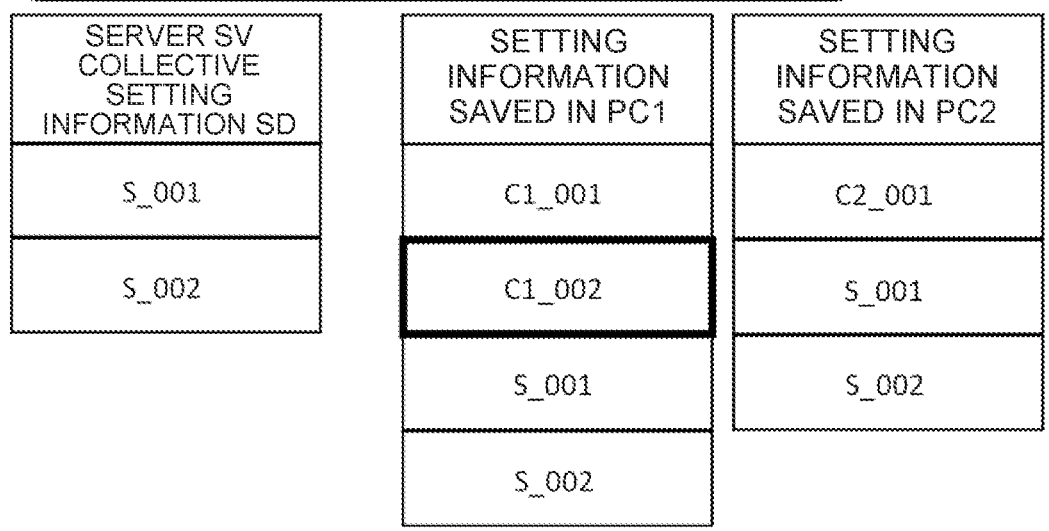
FIG. 10 is an explanation diagram of one embodiment of pieces of setting information saved in the setting management device and the information processing device of this disclosure.

Similarly to FIG. 8, FIG. 10 shows the pieces of setting information that are saved in the server SV and the two client personal computers (PC1, PC2) and the sharing setting flag F of the server SV is assumed to be set as "enabled" (ON).

Further, in FIG. 10, it is assumed that, after the saving state in FIG. 9, inherent setting information CD having a name of C1_002 is added and saved in the client personal computer PC1.

In this case, the inherent setting information C1_002 is simply added and saved in the client personal computer PC1 and the saving state in the server SV and another client personal computer PC2 is not changed.

Figure 17:
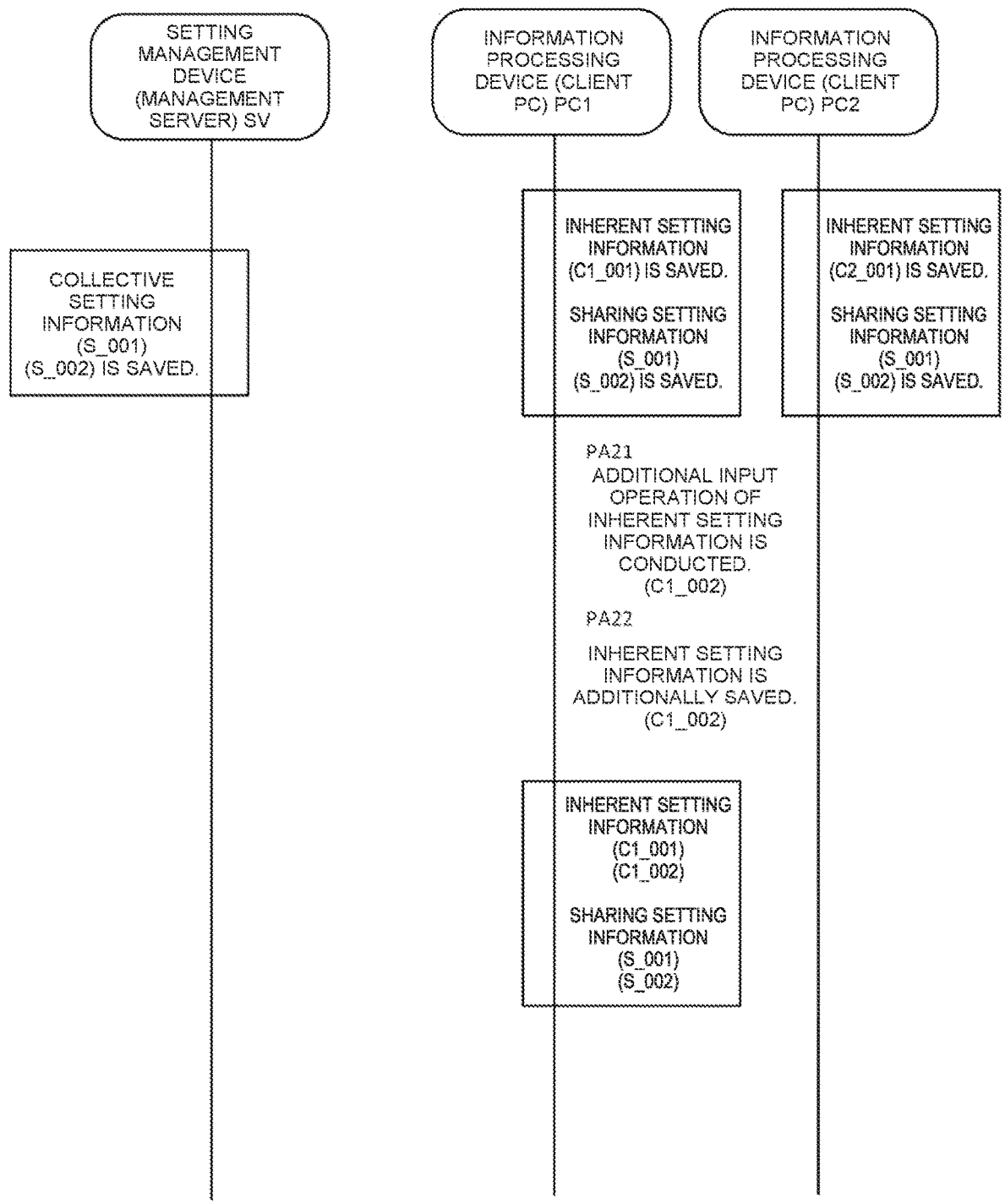
FIG. 17 is a communication sequence of one embodiment of a communication process between the setting management device and the information processing device of this disclosure.

FIG. 17 shows a communication sequence of one embodiment of a communication process between the setting management device and the information processing device.

This communication sequence corresponds to the saving state of the pieces of setting information in FIG. 10.

In the communication sequence in FIG. 17, it is assumed as the premise that two pieces of collective setting information S_001 and S_002 are saved in the setting management device SV, inherent setting information C1_001 and two pieces of sharing setting information (S_001, S_002) are saved in the information processing device PC1, and inherent setting information C2_001 and two pieces of sharing setting information (S_001, S_002) are saved in the information processing device PC2.

It is assumed that, in a step PA21 of the information processing device PC1 in FIG. 17, an operation of adding and saving inherent setting information CD having a name of "C1_002" is conducted.

The inherent setting information CD having the name of "C1_002" is simply saved in the storage 90 of the information processing device PC1 in a step PA22, and the saving state of the setting management device SV and the information processing device PC2 is not changed. That is, the two pieces of inherent setting information (C1_001, C1_002) and the two pieces of sharing setting information (S_001, S_002) are saved in the information processing device PC1.

Embodiment 4 of the Setting Information: Erasing of the Collective Setting Information in the Server FIG. 11 shows an explanation diagram of one embodiment of pieces of setting information saved in the setting management device and the information processing device.

Figure 11:
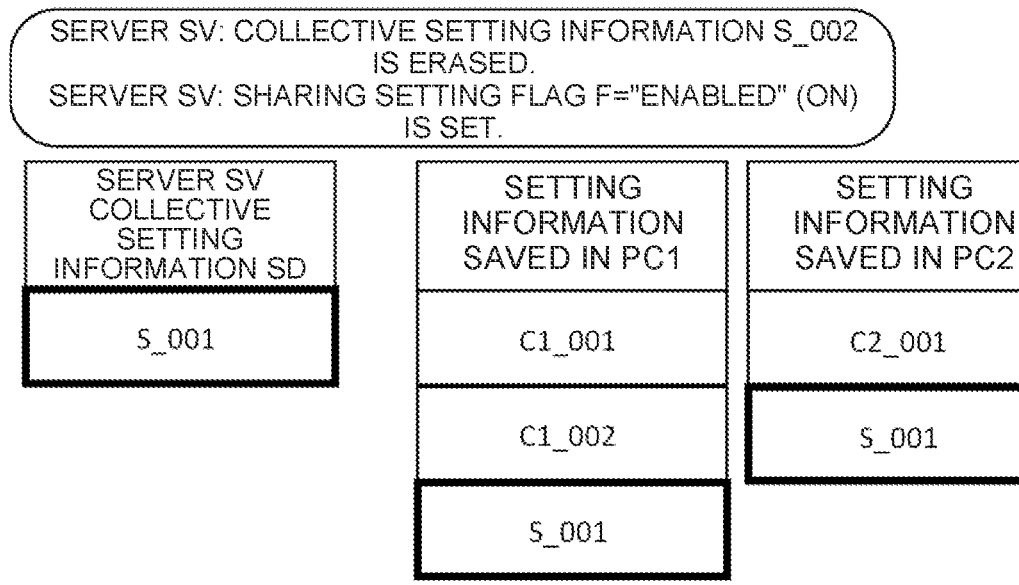
FIG. 11 is an explanation diagram of one embodiment of pieces of setting information saved in the setting management device and the information processing device of this disclosure.

Similarly to FIG. 8, FIG. 11 shows pieces of setting information saved in the server SV and the two client personal computers (PC1, PC2) and the sharing setting flag F of the server SV is assumed to be set as "enabled" (ON).

Further, in FIG. 11, it is assumed that, after the saving state in FIG. 10, the collective setting information SD having the name of S_002 is erased in the server SV.

In this case, in the server SV, the collective setting information S_002 is erased and the collective setting information S_001 is saved.

Further, since the sharing setting flag F in the server SV is set as "enabled" (ON), the collective setting information having the name of S_002 is erased in the two client personal computers (PC1, PC2). The erasing of the collective setting information S_002 in each of the client personal computers (PC1, PC2) is conducted after an erasing request from the server SV is received.

Therefore, as shown in FIG. 11, the two pieces of inherent setting information (C1_001, C1_002) and the sharing setting information S_001 are saved in the information processing device PC1.

Further, the inherent setting information C2_001 and the sharing setting information S_001 are saved in the information processing device PC2.

Figure 18:
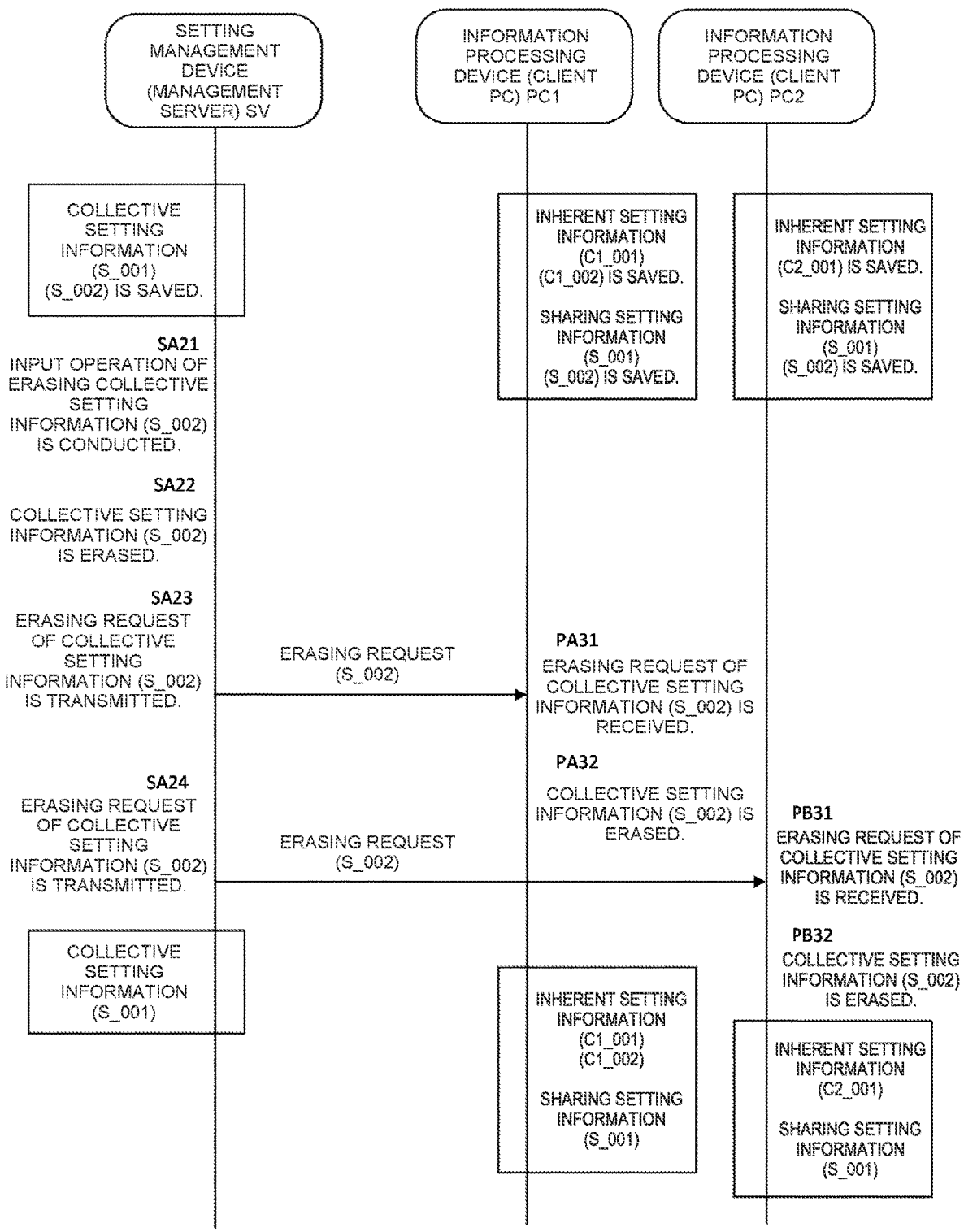
FIG. 18 is a communication sequence of one embodiment of a communication process between the setting management device and the information processing device of this disclosure.

FIG. 18 shows a communication sequence of one embodiment of a communication process between the setting management device and the information processing device.

This communication sequence corresponds to the saving state of the pieces of setting information in FIG. 11.

In the communication sequence in FIG. 18, it is assumed as the premise that two pieces of collective setting information (S_001, S_002) are saved in the setting management device SV, two pieces of inherent setting information (C1_001, C1_002) and two pieces of sharing setting information (S_001, S_002) are saved in the information processing device PC1, and inherent setting information C2_001 and two pieces of sharing setting information (S_001, S_002) are saved in the information processing device PC2.

It is assumed that an input operation of erasing the collective setting information SD having the name of "S_002" is conducted in a step SA21 of the setting management device SV in FIG. 18.

In a step SA22, the collective setting information S_002 is erased in the storage 40 of the setting management device SV. On the other hand, the collective setting information S_001 is not erased.

In the step SA23, an erasing request of the collective setting information S_002 is transmitted to the information processing device PC1.

The erasing request of the collective setting information S_002 is received in a step PA31 of the information processing device PC1.

In a step PA32, the collective setting information S_002 is erased in the storage 90 of the information processing device PC1.

Further, similarly, in a step SA24, an erasing request of the collective setting information S_002 is transmitted to the information processing device PC2.

The erasing request of the collective setting information S_002 is received in a step PB31 of the information processing device PC2.

In a step PB32, the collective setting information S_002 is erased in the storage 90 of the information processing device PC2.

Therefore, the collective setting information S_002 that has been shared is erased in the setting management device SV and the two information processing device (PC1, PC2). As shown in FIG. 18, the collective setting information S_001 is saved in the setting management device SV, the two pieces of inherent setting information (C1_001, C1_002) and the sharing setting information S_001 are saved in the information processing device PC1, and the inherent setting information C2_001 and the sharing setting information S_001 are saved in the information processing device PC2.

Figure 12:
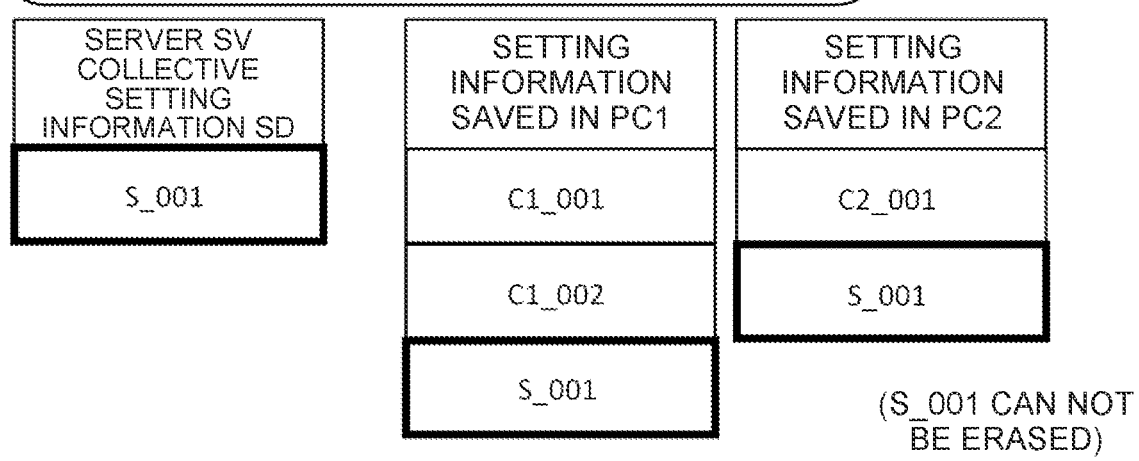
FIG. 12 is an explanation diagram of one embodiment of pieces of setting information saved in the setting management device and the information processing device of this disclosure.

Embodiment 5 of the Setting Information: Erasing of the Collective Setting Information in the Client PC FIG. 12 shows an explanation diagram of one embodiment of pieces of setting information saved in the setting management device and the information processing device. Similarly to FIG. 8, FIG. 12 shows the pieces of setting information saved in the server SV and two client personal computers (PC1, PC2) and the sharing setting flag F of the server SV is assumed to be set as "enabled" (ON).

Further, in FIG. 12, it is assumed that, after the saving state in FIG. 11, an operation of erasing the collective setting information SD having the name of S_001 is conducted in the client personal computer PC1.

In this case, since the collective setting information S_001 is information shared in all information processing devices PC, the collective setting information S_001 cannot be erased in the PC1 that is a client personal computer, and the collective setting information S_001 can be erased only in the setting management device SV.

Therefore, the collective setting information S_001 is saved in the setting management device SV and the two client personal computers (PC1, PC2), and the saving state is same as the saving state shown in FIG. 11.

When an operation of erasing the collective setting information SD is conducted in the client personal computer PC, a warning screen indicating that this operation is invalid, etc. may be displayed.

Figure 19:
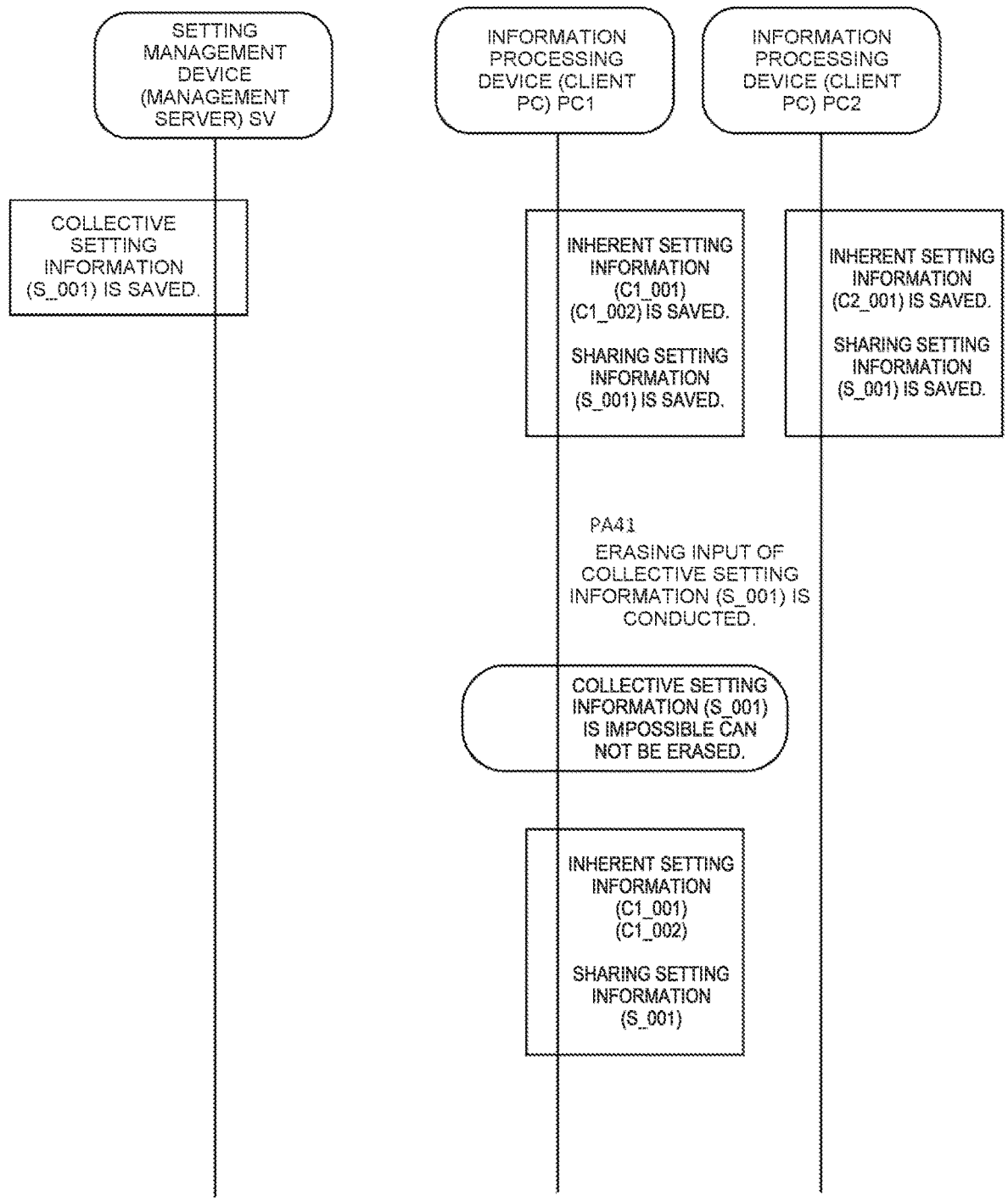
FIG. 19 is a communication sequence of one embodiment of a communication process between the setting management device and the information processing device of this disclosure.

FIG. 19 shows a communication sequence of one embodiment of a communication process between the setting management device and the information processing device.

This communication sequence corresponds to the saving state of the pieces of setting information in FIG. 12.

In the communication sequence in FIG. 19, it is assumed as the premise that collective setting information S_001 is saved in the setting management device SV, two pieces of inherent setting information (C1_001, C1_002) and sharing setting information S_001 are saved in the information processing device PC1, and inherent setting information C2_001 and sharing setting information S_001 are saved in the information processing device PC2.

It is assumed that, in a step PA41 of the information processing device PC1 in FIG. 19, an operation of erasing the collective setting information SD having the name of "S_001" is conducted. As described above, the collective setting information S_001 cannot be erased in the information processing device PC1, this input operation is ignored. Therefore, the saving state in the setting management device SV and the two information processing devices (PC1, PC2) is not changed.

Figure 13:
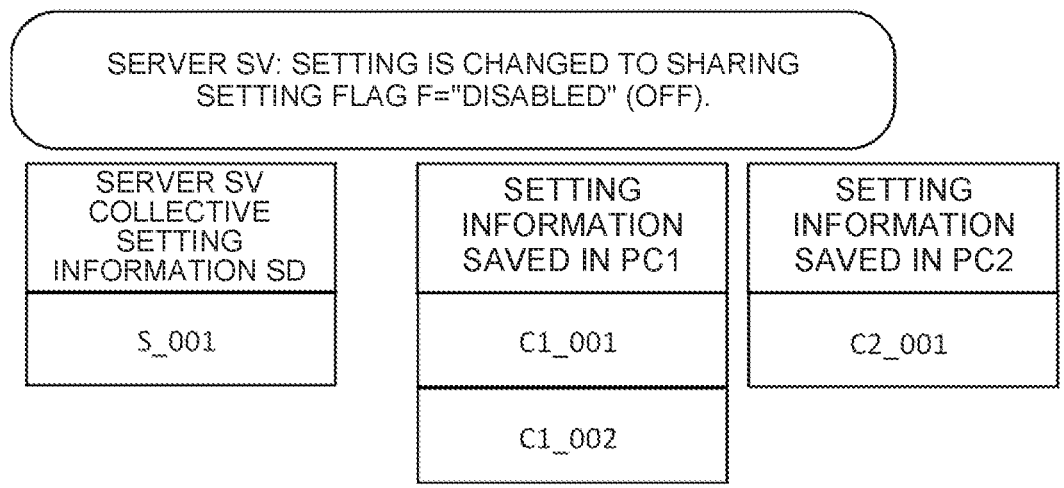
FIG. 13 is an explanation diagram of one embodiment of pieces of setting information saved in the setting management device and the information processing device of this disclosure.

Embodiment 6 of the Setting Information: Disabled (OFF) Setting of the Sharing Setting Flag FIG. 13 shows an explanation diagram of one embodiment of pieces of setting information saved in the setting management device and the information processing device. Similarly to FIG. 8, FIG. 13 shows the pieces of setting information saved in the server SV and two client personal computers (PC1, PC2).

Note that, in FIG. 13, it is assumed that the setting of the sharing setting flag F of the server SV is changed to "disabled" (OFF) after the saving state in FIG. 12.

Since the sharing setting flag F is changed to "disabled" (OFF), sharing of the collective setting information SD is disabled.

That is, when the shared collective setting information SD is saved in the information processing device PC, this shared collective setting information SD is erased in this information processing device PC.

Note that the collective setting information SD saved in the setting management device SV is not erased.

The erasing of the collective setting information SD saved in the information processing device PC is conducted when an erasing request transmitted from the setting management device SV is received.

Therefore, as shown in FIG. 13, the saving state in the setting management device SV is not changed and the sharing setting information S_001 is still being saved.

However, in the information processing device PC1, the sharing setting information S_001 is erased and the two pieces of inherent setting information (C1_001, C1_002) are saved. Further, in the information processing device PC2, the sharing setting information S_001 is erased and only the inherent setting information C2_001 is saved.

Figure 20:
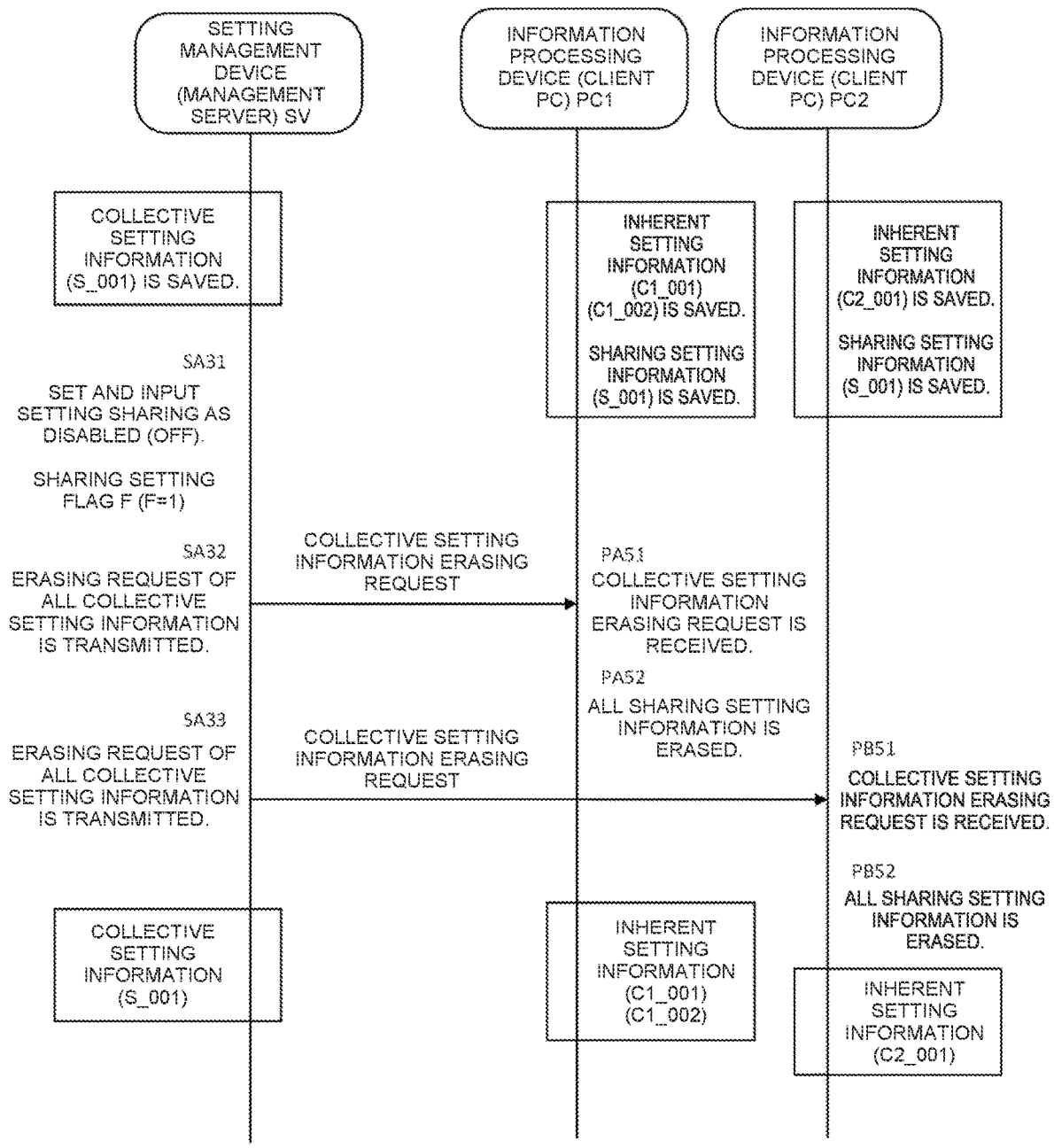
FIG. 20 is a communication sequence of one embodiment of a communication process between the setting management device and the information processing device of this disclosure.

FIG. 20 shows a communication sequence of one embodiment of a communication process between the setting management device and the information processing device.

This communication sequence corresponds to the saving state of the pieces of setting information in FIG. 13.

In the communication sequence in FIG. 20, it is assumed as the premise that collective setting information S_001 is saved in the setting management device SV, two pieces of inherent setting information (C1_001, C1_002) and sharing setting information S_001 are saved in the information processing device PC1, and inherent setting information C2_001 and sharing setting information S_001 are saved in the information processing device PC2.

It is assumed that an input operation of setting the print setting sharing as disabled (OFF) is conducted in a step SA31 of the setting management device SV in FIG. 20.
In this case, the sharing setting flag F is changed to "1".
Since the print setting sharing is disabled (OFF), in order to disable the sharing of the collective setting information, an erasing request of all pieces of collective setting information is transmitted to all of the information processing devices PC.

In a step SA32, the erasing request of all of the pieces of collective setting information is transmitted to the information processing device PC1.
The erasing request of the collective setting information is received in a step PA51 of the information processing device PC1.
In a step PA52, all of the pieces of collective setting information (S_001) is erased in the storage 90 of the information processing device PC1.

Further, similarly, in a step SA33, the erasing request of all of the pieces of collective setting information is transmitted to the information processing device PC2.
The erasing request of the collective setting information is received in a step PB51 of the information processing device PC2.
In a step PA52, all of the pieces of collective setting information (S_001) are erased in the storage 90 of the information processing device PC2.

Therefore, all of the shared pieces of collective setting information are erased in the two information processing devices (PC1, PC2). However, the collective setting information SD saved in the setting management device SV is not erased.
As shown in FIG. 20, although the collective setting information S_001 is still being saved in the setting management device SV, the collective setting information S_001 is erased and the two pieces of inherent setting information (C1_001, C1_002) are saved in the information processing device PC1, and the collective setting information S_001 is erased and only the inherent setting information C2_001 is saved in the information processing device PC2.

Embodiment of Processes of Delivering and Acquiring of the Setting Information Hereinafter, there are explained the sharing setting process in a setting management device SV, a delivering process of the collective setting information saved in the setting management device SV, and an acquiring process of the collective setting information in the information processing device PC.

Embodiment 1 of Processes of Delivering and Acquiring of Setting Information)

Figure 21:
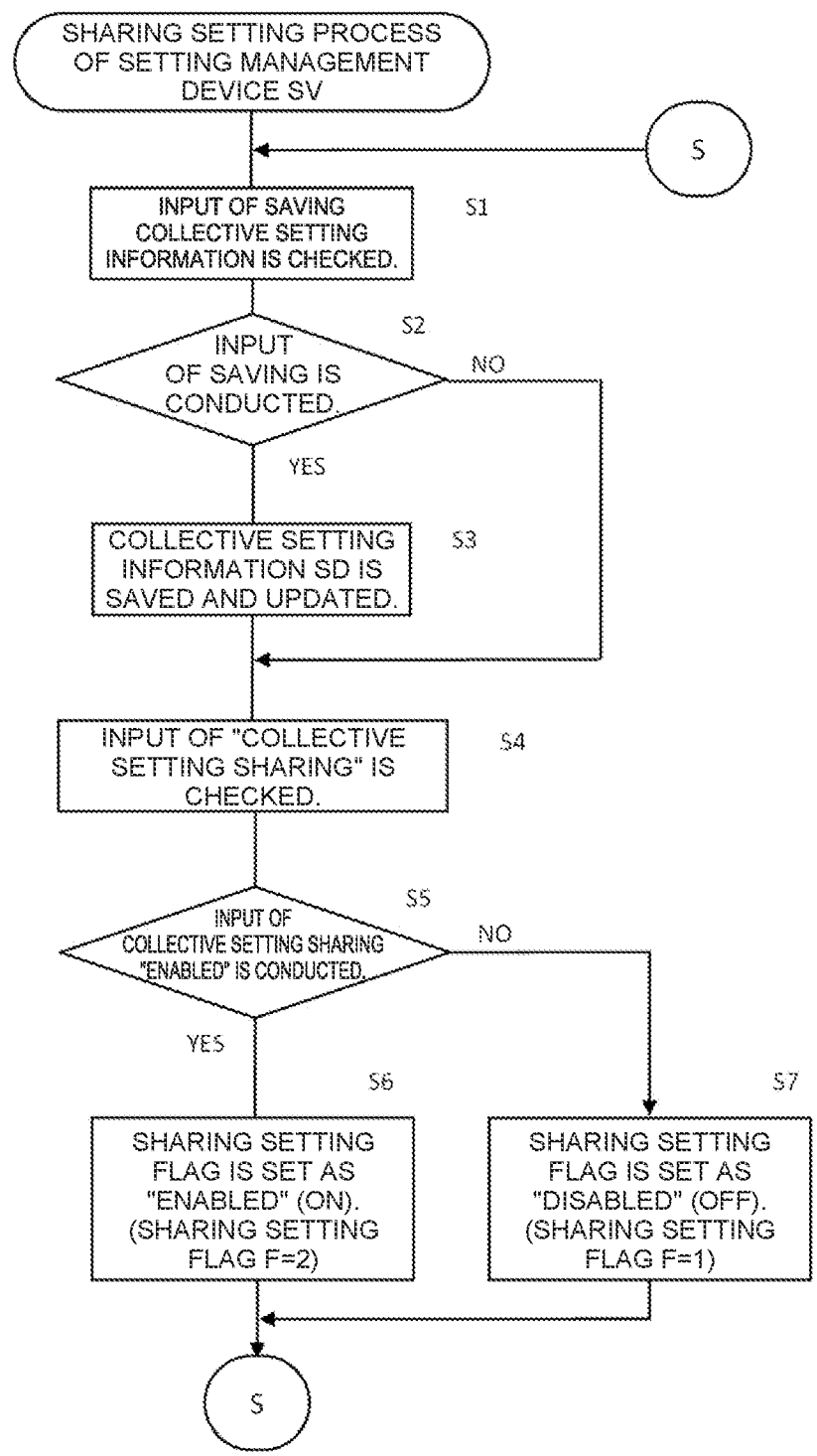
FIG. 21 is a flowchart of one embodiment of a sharing setting process in the setting management device of this disclosure.

One Embodiment of the Shared Setting Process in the Setting Management Device
FIG. 21 shows a flowchart of one embodiment of the sharing setting process in the setting management device.
Here, it is assumed that, in the setting management device SV, a display region for setting the "collective setting sharing" is included in the setting screen for setting a plurality of setting items of a printer driver (printer driver setting screen).

Figure 28A:
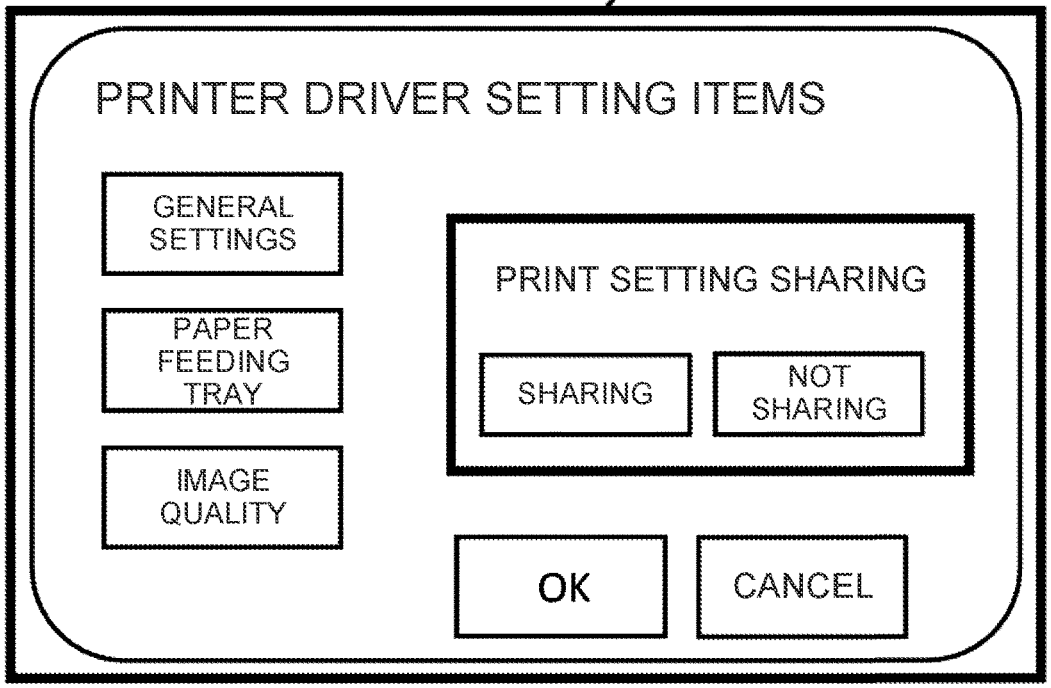
FIG. 28A and FIG. 28B are explanation diagrams of one embodiment of a setting display screen (printer driver setting screen) including print setting sharing in the setting management device of this disclosure.
Figure 28B:
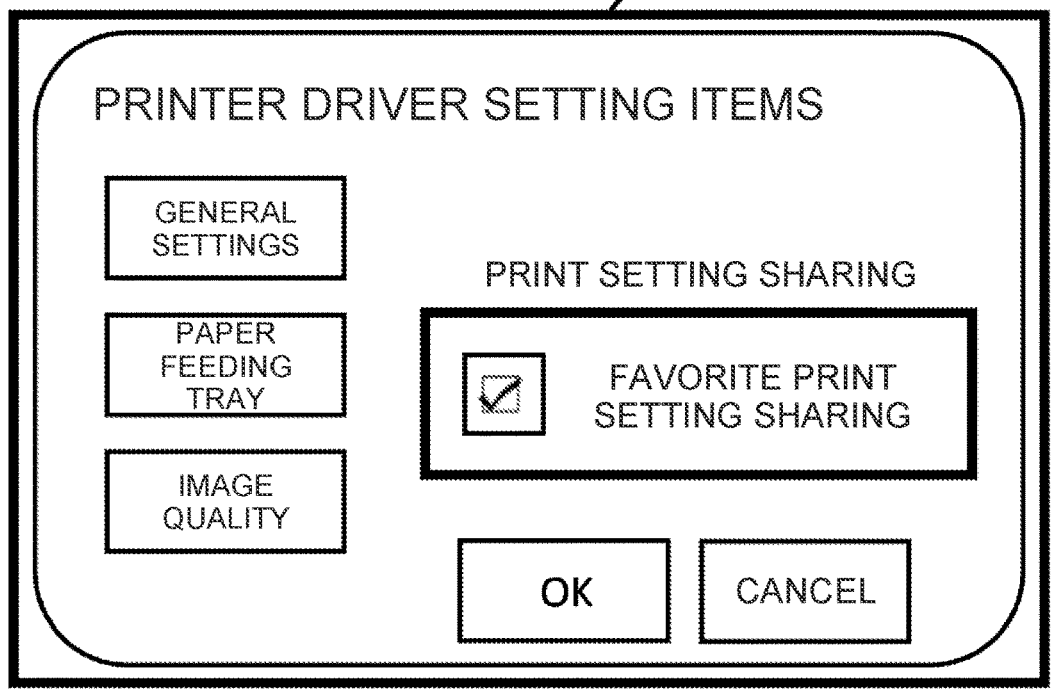

Further, it is assumed that, in the sharing setting process, the management person, etc. of the setting management device SV applies a name of collective setting information SD, conducts an input operation of saving the collective setting information SD, and further, sets enabled (sharing) or disabled (not sharing) of the "collective setting sharing" that decides whether the collective setting information SD is to be shared or not.
For example, when a "print setting sharing" corresponding to the "collective setting sharing" is to be set, a printer driver setting screen as shown in FIG. 28A and FIG. 28B described below is displayed and the enabled (sharing) or disabled (not sharing) of the "print setting sharing" is set.

In a step S1 in FIG. 21, whether an input operation of saving the collective setting information SD is conducted or not is checked.
In the input operation of saving the collective setting information SD, for example, the setting contents of the setting items about the printing function (number of copies, paper size, paper direction, etc.) are selected and inputted, then a name is applied to the collective setting information (favorite) SD and an input operation that means "saving" is conducted.
When, in a step S2, an input operation of saving the collective setting information SD is conducted, the process proceeds to a step S3. Otherwise, the process proceeds to a step S4.
In the step S3, the collective setting information SD is saved in the storage 40. Further, when collective setting information SD having the same name is already saved in the storage 40, the corresponding collective setting information SD is updated (rewritten and saved).

In the step S4, whether the "collective setting sharing" is inputted or not is checked. Here, whether the "collective setting sharing" is set as "enabled" (sharing) or set as "disabled" (not sharing) is checked.
For example, when it is intended that the collective setting information SD about the printing function that is saved by the management person is shared in a plurality of information processing devices PC, an input operation of setting the "print setting sharing" corresponding to the "collective setting sharing" as enabled (sharing) may be conducted.

In a step S5, when "enabled" (sharing) is inputted in the "collective setting sharing", the process proceeds to a step S6. Otherwise, that is, when "disabled" (not sharing) is inputted in the "collective setting sharing", the process proceeds to a step S7.
In the step S6, the sharing setting flag F is set as "enabled" (ON) (F=2) and the process returns to the step S1.
In the step S7, the sharing setting flag F is set as "disabled" (OFF) (F=1) and the process returns to the step S1.

As described above, when the sharing setting flag F is set as "enabled" (ON), as in the process described below, after the sharing setting flag F is set, the collective setting information SD is delivered to the plurality of information processing devices PC and the collective setting information SD is shared in these information processing devices PC.
On the other hand, when the sharing setting flag F is set as "disabled" (OFF), the collective setting information SD is saved in the setting management device SV. However, the collective setting information SD is not delivered to the plurality of information processing devices PC.

Note that, when the collective setting information SD is saved in the registry as shown in FIG. 6 and FIG. 7 described above and the "collective setting sharing" is set as "enabled" (sharing), "2" is written on the head of the data of the collective setting information SD.

On the other hand, when the "collective setting sharing" is set as "disabled" (not sharing), "1" is written on the head of the data of the collective setting information SD.

Figure 22:
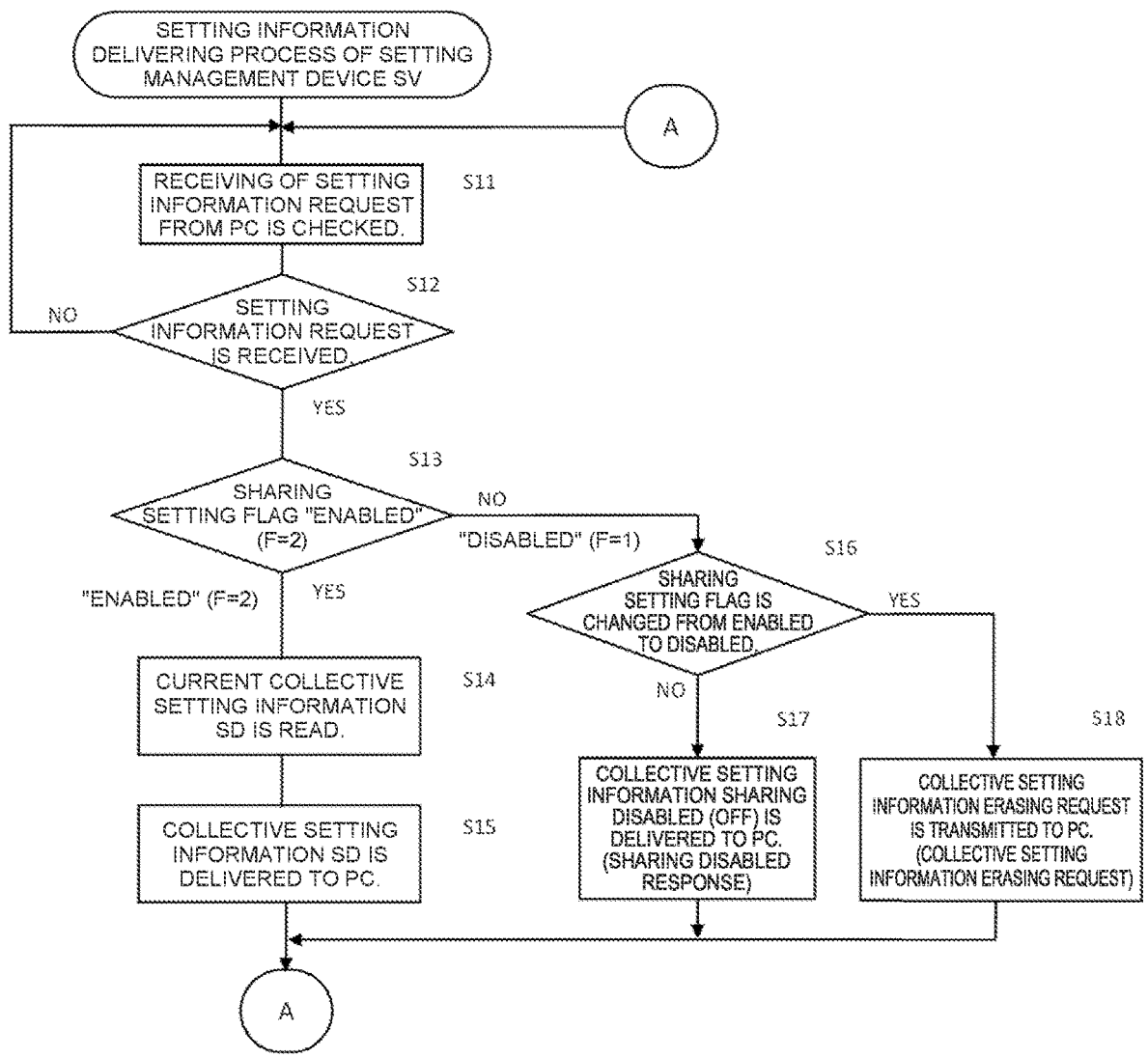
FIG. 22 is a flowchart of one embodiment of a setting information delivering process in the setting management device of this disclosure.

One Embodiment of a Setting Information Delivering Process in the Setting Management Device FIG. 22 shows a flowchart of one embodiment of a setting information delivering process in the setting management device.

Here, there is explained a process in which, when a setting information request for requesting collective setting information is received from the information processing device PC, the collective setting information SD currently saved in the setting management device SV is delivered to the information processing device PC that is the transmission source of the setting information request.

Further, when the sharing setting flag is set as enabled (F=2), the collective setting information SD is delivered. When the sharing setting flag is changed from enabled (F=2) to disabled (F=1), a request of erasing the collective setting information SD (collective setting information erasing request) is transmitted to the information processing device PC.

In a step S11 in FIG. 22, whether a setting information request from the information processing device PC is received or not is checked.

When, in a step S12, the setting information request is received, the process proceeds to a step S13. Otherwise, the process returns to the step S11.

In a step S13, when the sharing setting flag is set as enabled (F=2), the process proceeds to a step S14. Otherwise, that is, when the sharing setting flag is set as disabled (F=1), the process proceeds to a step S16.

In the step S14, the current collective setting information SD saved in the storage 40 is read. In a step S15, the read collective setting information SD is delivered to the information processing device PC that is the transmission source of the setting information request and the process returns to the step S11.

Note that, since the sharing setting flag is set as enabled and the read collective setting information SD is set as "sharing", it is preferable that the read collective setting information SD is delivered to all of the information processing devices PC that can be connected to the setting management device SV including not only the information processing device PC that is the transmission source of the setting information request but also the information processing device PC that is not the transmission source of the setting information request.

Further, whether the delivering is conducted or not and the date of delivering are saved for each collective setting information SD saved in the setting management device SV, only the collective setting information that has not been delivered to the information processing device PC is delivered, and the collective setting information that has been delivered may not be delivered.

In a step S16, when the sharing setting flag F is changed to "disabled" from "enabled" at the time of the last check and is currently set as "disabled", the process proceeds to a step S18. When the sharing setting flag F has been set as disabled since the last check, the process proceeds to a step S17.

In the step S17, as the response to the setting information request from the information processing device PC, "sharing disabled response" indicating that the sharing of collective setting information is currently set as disabled (OFF) is transmitted to the information processing device PC that is the transmission source of the setting information request and the process returns to the step S11.

Note that, the "sharing disabled response" may not be transmitted and, when the collective setting information SD has not been received in the information processing device PC in a predetermined amount of time after the transmission of the setting information request, it is decided that the sharing of collective setting information is set as disabled (OFF).

In a step S18, when the sharing setting flag F is changed from "enabled" to "disabled", it is decided that the sharing of collective setting information is disabled and information that requests erasing of the collective setting information SD (collective setting information erasing request) is transmitted to all of the information processing devices PC that can be connected to the setting management device SV, and the process returns to the step S11.

As described above, when the setting information request is received from the information processing device PC and the sharing setting flag F is set as "enabled", the collective setting information SD is delivered.

According to the above, when it is interned by the intention of the management person of the setting management device SV that the collective setting information is shared in the plurality of information processing devices PC, the collective setting information SD can be shared.

Note that, in FIG. 22, although the collective setting information SD is delivered on the condition that the setting information request is received, this disclosure is not limited thereto.

For example, when new collective setting information SD is added to the setting management device SV, or when the collective setting information SD having the same name is updated, the added or updated collective setting information SD may be delivered to all of the information processing devices PC that can be connected to the setting management device SV without receiving of the setting information request from the information processing device PC.

One Embodiment of a Setting Information Acquiring Process in the Information Processing Device)

Figure 23:
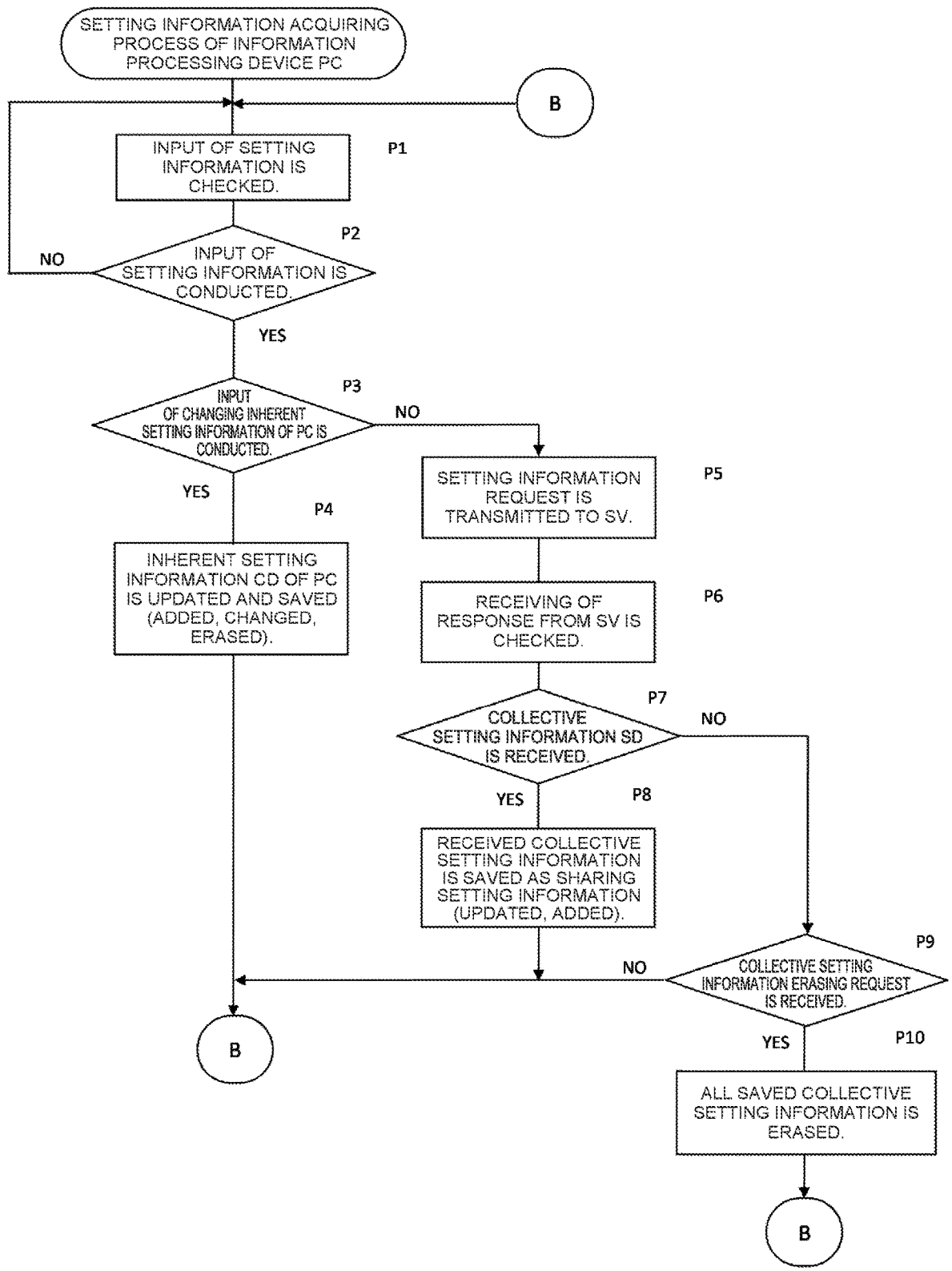
FIG. 23 is a flowchart of one embodiment of a setting information acquiring process in the information processing device of this disclosure.

FIG. 23 shows a flowchart of one embodiment of a setting information acquiring process in the information processing device.

When a user sets and inputs, in the information processing device PC, inherent setting information CD that is effective only in this information processing device PC, this inherent setting information CD is saved in the storage 90.

Further, when collective setting information SD is transmitted from the setting management device SV after the setting information request is transmitted to the setting management device SV, the corresponding collective setting information SD is saved as the sharing setting information.

Further, when the erasing request of the collective setting information is transmitted from the setting management device SV, all of the pieces of collective setting information (sharing setting information) already saved in the storage 90 are erased.

In a step P1 in FIG. 23, whether the setting information is inputted or not is checked. The setting information in this case is setting information of the setting items that is used only in the information processing device PC in which the input operation is conducted.

When, in a step P2, the setting information is inputted, the process proceeds to a step P3. Otherwise, the process returns to the step P1.

In the step P3, an input operation of changing the individual inherent setting information in the information processing device PC (inherent favorite), or an input operation of saving new inherent setting information is conducted, the process proceeds to a step P4. Otherwise, the process proceeds to a step P5.

In the step P4, after the individual inherent setting information CD in the information processing device PC is updated and saved, the process returns to the step P1.

For example, when a new name is applied to the individual inherent setting information CD and this individual inherent setting information CD is saved, the new inherent setting information CD is added. When the individual inherent setting information is saved with the same name, the content of the inherent setting information CD is changed. Further, when an operation of erasing the inherent setting information CD is conducted, this inherent setting information CD is erased.

In a step P5, when the content of the predetermined setting item of the information processing device PC is changed but an input operation of changing the individual inherent setting information is not conducted, a setting information request is transmitted to the setting management device SV.

In a step P6, whether a response from the setting management device SV is received or not is checked.

In a step P7, when collective setting information SD is received from the setting management device SV, the process proceeds to a step P8. Otherwise, the process proceeds to a step P9.

In the step P8, the received collective setting information SD is saved as the sharing setting information SD and the process returns to the step P1.

When sharing setting information SD having the same name already exists in the information processing device PC, this sharing setting information SD is updated. When sharing setting information SD having the same name does not exist in the information processing device PC, the sharing setting information SD is added.

When, in a step P9, an erasing request of the collective setting information is received, the process proceeds to a step P10. Otherwise, the process returns to the step P1.

In the step P10, all of the pieces of collective setting information (sharing setting information SD) saved in the storage 90 of the information processing device PC are erased and the process returns to the step P1.

As described above, in the information processing device PC, the inherent setting information is saved, and further, the collective setting information from the setting management device SV is saved or erased.

Since the inherent setting information saved by the user in the information processing device PC and the sharing setting information that is shared are separately saved in the storage 90, when sharing setting information that is shared in the plurality of information processing devices PC is erased, the individually saved inherent setting information is not erased. That is, the shared sharing setting information SD is erased by the erasing request from the setting management device SV and is not erased by an input operation of erasing in the information processing device PC. On the other hand, the inherent setting information CD that is individually saved in the information processing device PC is erased by an input operation of erasing by an intention of the user in the information processing device PC and is not erased by an erasing request from the setting management device SV.

Figure 24:
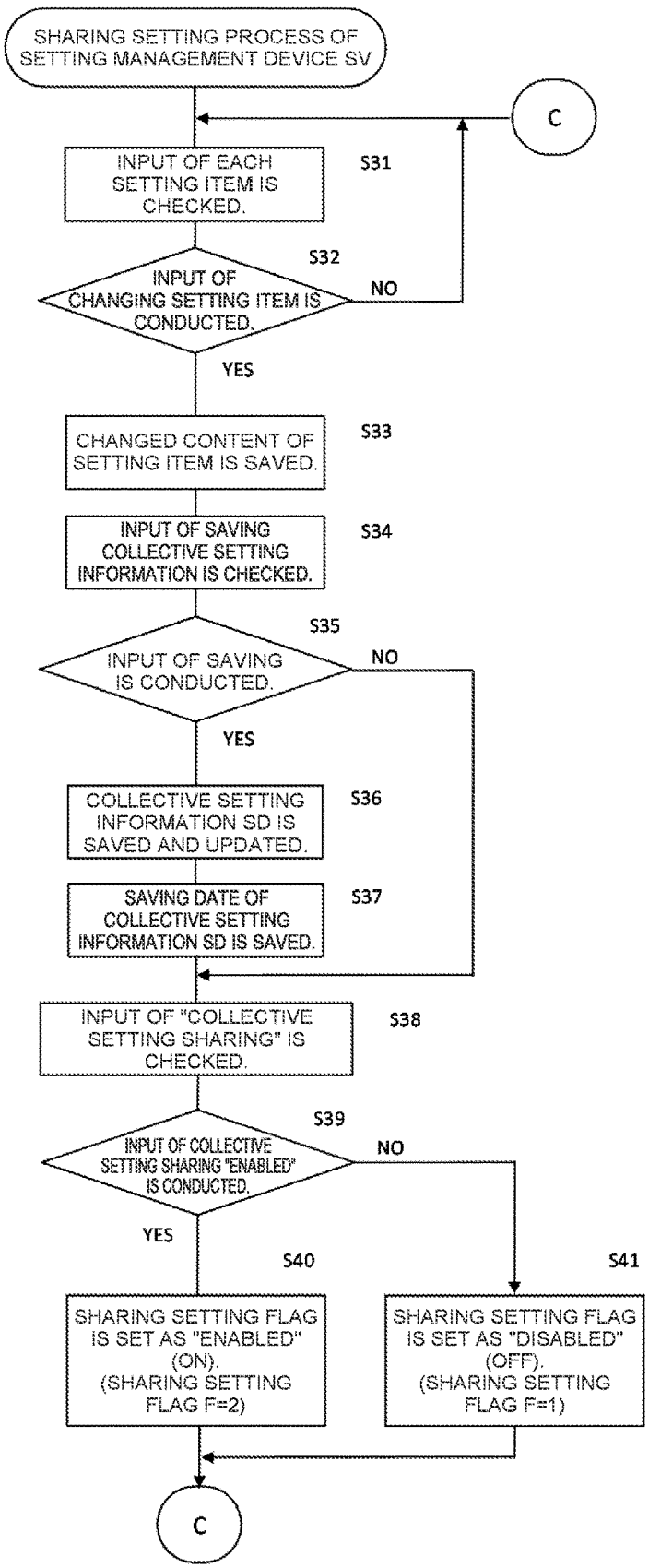
FIG. 24 is a flowchart of one embodiment of a sharing setting process in the setting management device of this disclosure.

Embodiment 2 of Processes of Delivering and Acquiring of the Setting Information One Embodiment of the Shared Setting Process in the Setting Management Device FIG. 24 shows a flowchart of one embodiment of a sharing setting process in the setting management device.

Here, the sharing setting process in FIG. 24 is different from the sharing setting process in FIG. 21 in that, when the collective setting information SD is saved in the storage 40, a date when this saving of the collective setting information SD is conducted (saving date information 44) is saved in association with the collective setting information SD.

In a step S31 in FIG. 24, whether an input of each of the setting items of the predetermined function is conducted or not is checked.

For example, whether an input operation of changing the content of each of the setting items about the printing function included in the printer driver is conducted or not is checked. When, in a step S32, an input of changing any of the setting items is conducted, the process proceeds to a step S33. Otherwise, the process returns to the step S31.

In the step S33, the changed content of the setting item is saved.

In a step S34, similarly to the step S1, whether an input operation of saving the collective setting information SD is conducted or not is checked.

When, in a step S35, the input operation of saving the collective setting information SD is conducted, the process proceeds to a step S36. Otherwise, the process proceeds to a step S38.

In the step S36, the collective setting information SD is saved in the storage 40. Further, when collective setting information SD having the same name is already saved in the storage 40, the corresponding collective setting information SD is updated (rewritten and saved).

In a step S37, a date when the collective setting information SD is saved (saving date information 44) is saved in association with the corresponding collective setting information SD.

In the step S38, similarly to the step S4, whether the "collective setting sharing" is input or not is checked.

Here, whether the "collective setting sharing" is set as "enabled" (sharing) or set as "disabled" (not sharing) is checked.

In a step S39, when "enabled" (sharing) is inputted to the "collective setting sharing", the process proceeds to a step S40. Otherwise, that is, when "disabled" (not sharing) is inputted to the "collective setting sharing", the process proceeds to a step S41. In the step S40, the sharing setting flag F is set as "enabled" (ON) (F=2) and the process returns to the step S31.

In the step S41, the sharing setting flag F is set as "disabled" (OFF) (F=1) and the process returns to the step S31.

As described above, in the setting management device SV, the date when the collective setting information SD is saved (saving date information 44) is added to the corresponding collective setting information SD that is saved in the storage 40.

As described above, by adding the saving date information 44 to the collective setting information SD and saving the corresponding collective setting information SD, the collective setting information to which new saving date information is added and that is saved can be delivered to the information processing device PC as described below.

Figure 25:
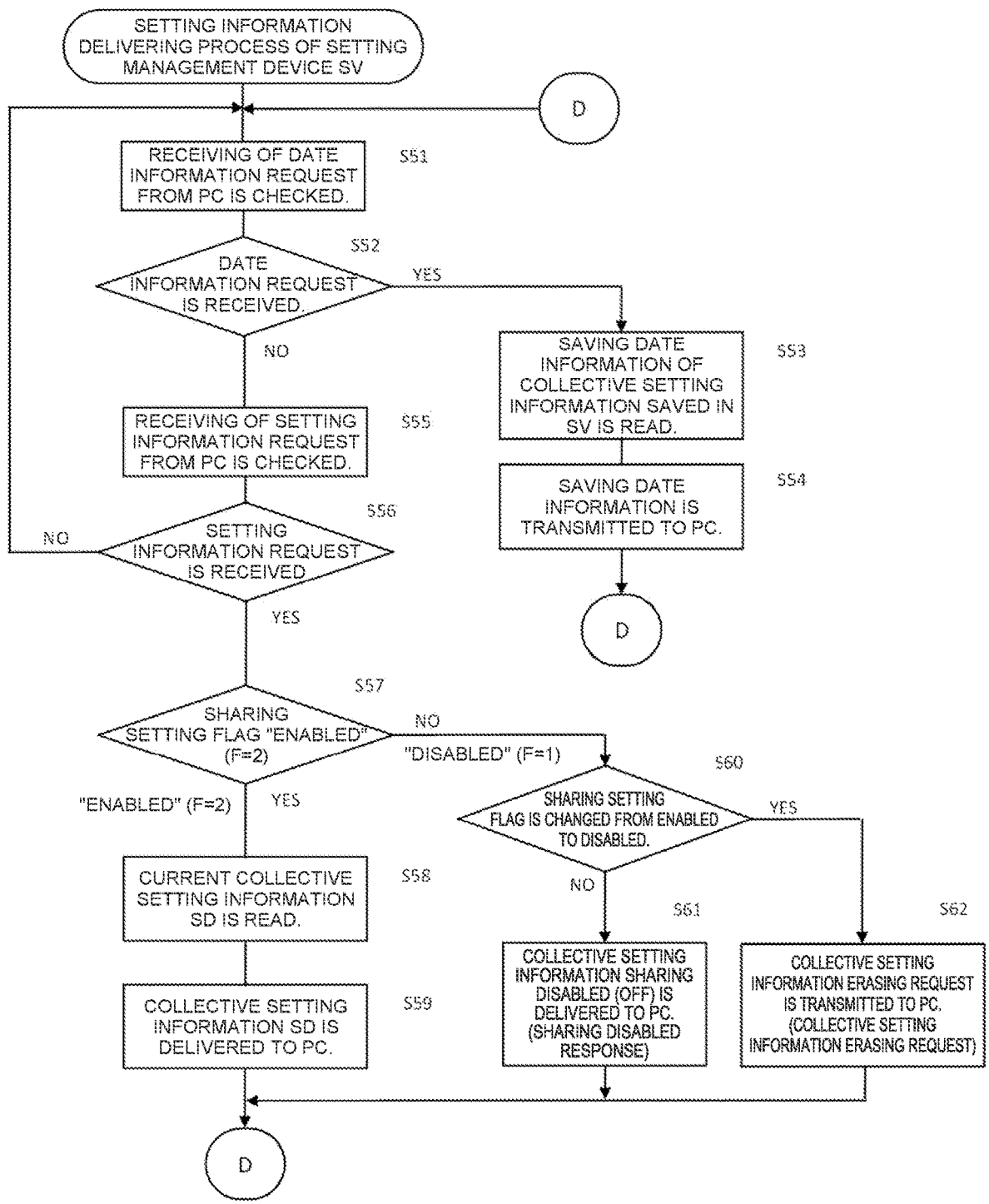
FIG. 25 is a flowchart of one embodiment of a setting information delivering process in the setting management device of this disclosure.

One Embodiment of a Setting Information Delivering Process in the Setting Management Device FIG. 25 shows a flowchart of one embodiment of a setting information delivering process in the setting management device.

Here, similarly to FIG. 22, there is explained a process in which, when a setting information request for requesting collective setting information is received from the information processing device PC, collective setting information SD currently saved in the setting management device SV is delivered to the information processing device PC that is the transmission source of the setting information request.

Note that the flowchart in FIG. 25 is different from the flowchart in FIG. 22 in that, when a date information request is received from the information processing device PC, the saving date information of the saved collective setting information is transmitted to this information processing device PC.

In a step S51 in FIG. 25, whether a date information request from the information processing device PC is received or not is checked.

When, in a step S52, a date information request is received, the process proceeds to a step S53. Otherwise, the process proceeds to a step S55.

In the step S53, saving date information 44 of the collective setting information SD saved in the setting management device SV is read.

Here, when the collective setting information SD is updated with the same name, the saving date information including the newest date (update day) is read.

In a step S54, the read saving date information 44 is transmitted to the information processing device PC that is the transmission source of the date information request and the process returns to the step S51.

In the step S55, similarly to the step S11 in FIG. 22, whether a setting information request from the information processing device PC is received or not is checked.

When, in a step S56, a setting information request is received, the process proceeds to a step S57. Otherwise, the process returns to the step S51.

In the step S57, when the sharing setting flag is set as enabled (F=2), the process proceeds to a step S58. Otherwise, that is, when the sharing setting flag is set as disabled (F=1), the process proceeds to a step S60.

In the step S58, similarly to the step S14, the current collective setting information SD saved in the storage 40 is read.

In a step S59, similarly to the step S15, the read collective setting information SD is delivered to the information processing device PC that is the transmission source of the setting information request and the process returns to the step S51.

Note that, since the sharing setting flag is set as enabled and the read collective setting information SD is set as "sharing", it is preferable that the read collective setting information SD is delivered to all of the information processing devices PC that can be connected to the setting management device SV including not only the information processing device PC that is the transmission source of the setting information request but also the information processing device PC that is not the transmission source of the setting information request.

In a step S60, when the sharing setting flag F is changed to "disabled" from "enabled" at the time of the last check and is currently "disabled", the process proceeds to a step S62. When the sharing setting flag F has been set as disabled since the last check, the process proceeds to a step S61.

In step S61, similarly to the step S17, "sharing disabled response" indicating that the sharing of collective setting information is currently set as disabled (OFF) is transmitted to the information processing device PC that is the transmission source of the setting information request as the response to the setting information request from the information processing device PC and the process returns to the step S51.

Note that, the "sharing disabled response" may not be transmitted and, when the collective setting information SD has not been received in the information processing device PC in a predetermined amount of time after the transmission of the setting information request, it is decided that the sharing of collective setting information is set as disabled (OFF).

In the step S62, similarly to the step S18, when the sharing setting flag F is changed from "enabled" to "disabled", it is decided that the sharing of collective setting information is disabled and information that requests erasing of the collective setting information SD (collective setting information erasing request) is transmitted to all of the information processing device PC that can be connected to the setting management device SV, and the process returns to the step S51.

As described above, when the setting information request is received from the information processing device PC and the sharing setting flag F is set as "enabled", the collective setting information SD is delivered.

According to the above, when it is interned by the intention of the management person of the setting management device SV that the collective setting information is shared in the plurality of information processing devices PC, the collective setting information SD can be shared. Further, when the date information request is received from the information processing device PC, the update date of the collective setting information SD (the newest saving date information 44) is transmitted.

Note that, in FIG. 25, similarly to FIG. 22, although the collective setting information SD is delivered on the condition that the setting information request is received, this disclosure is not limited thereto.

One Embodiment of a Setting Information Acquiring Process in the Information Processing Device)

Figure 26:
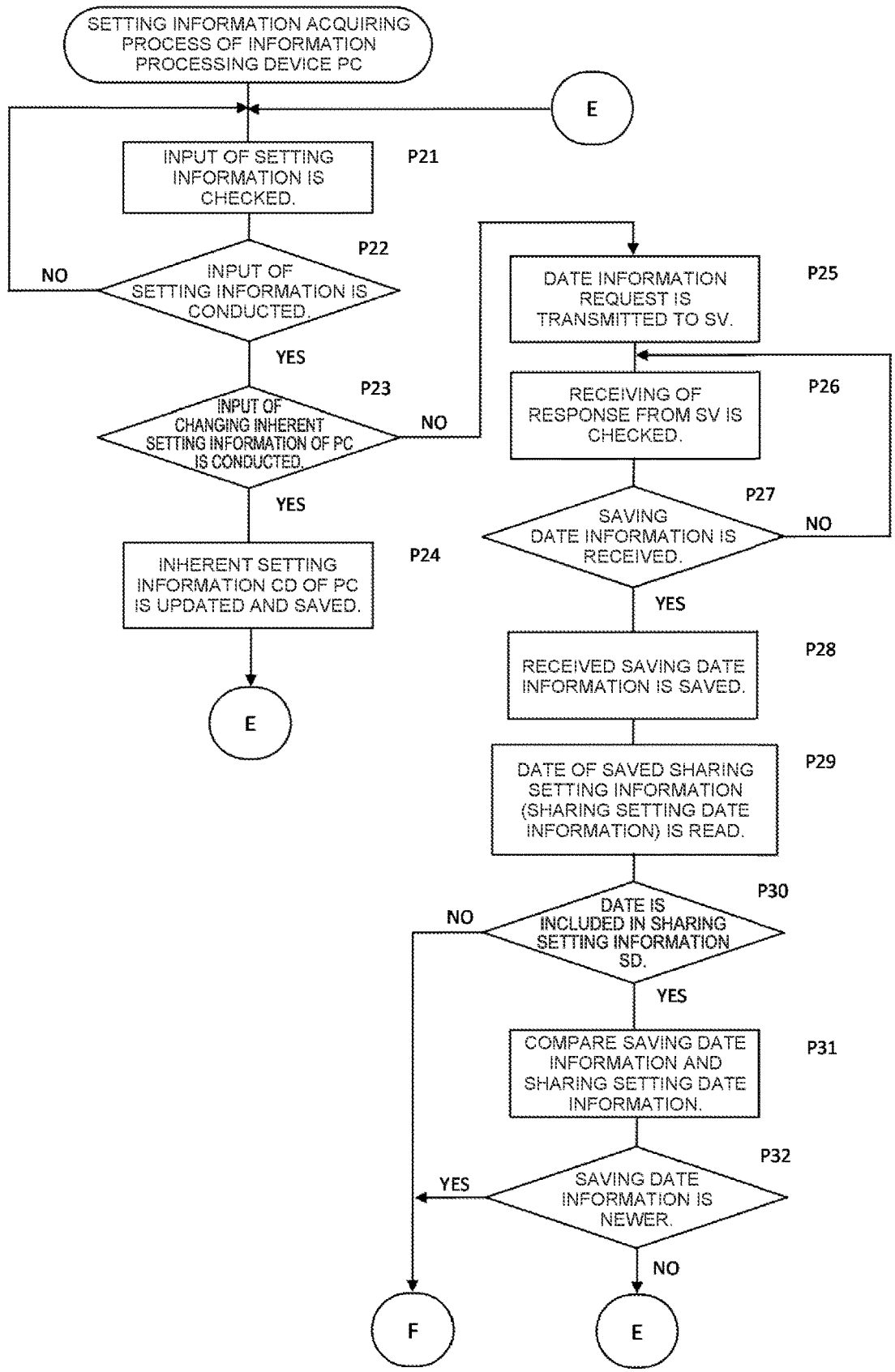
FIG. 26 is a flowchart of one embodiment of a setting information acquiring process in the information processing device of this disclosure.
Figure 27:
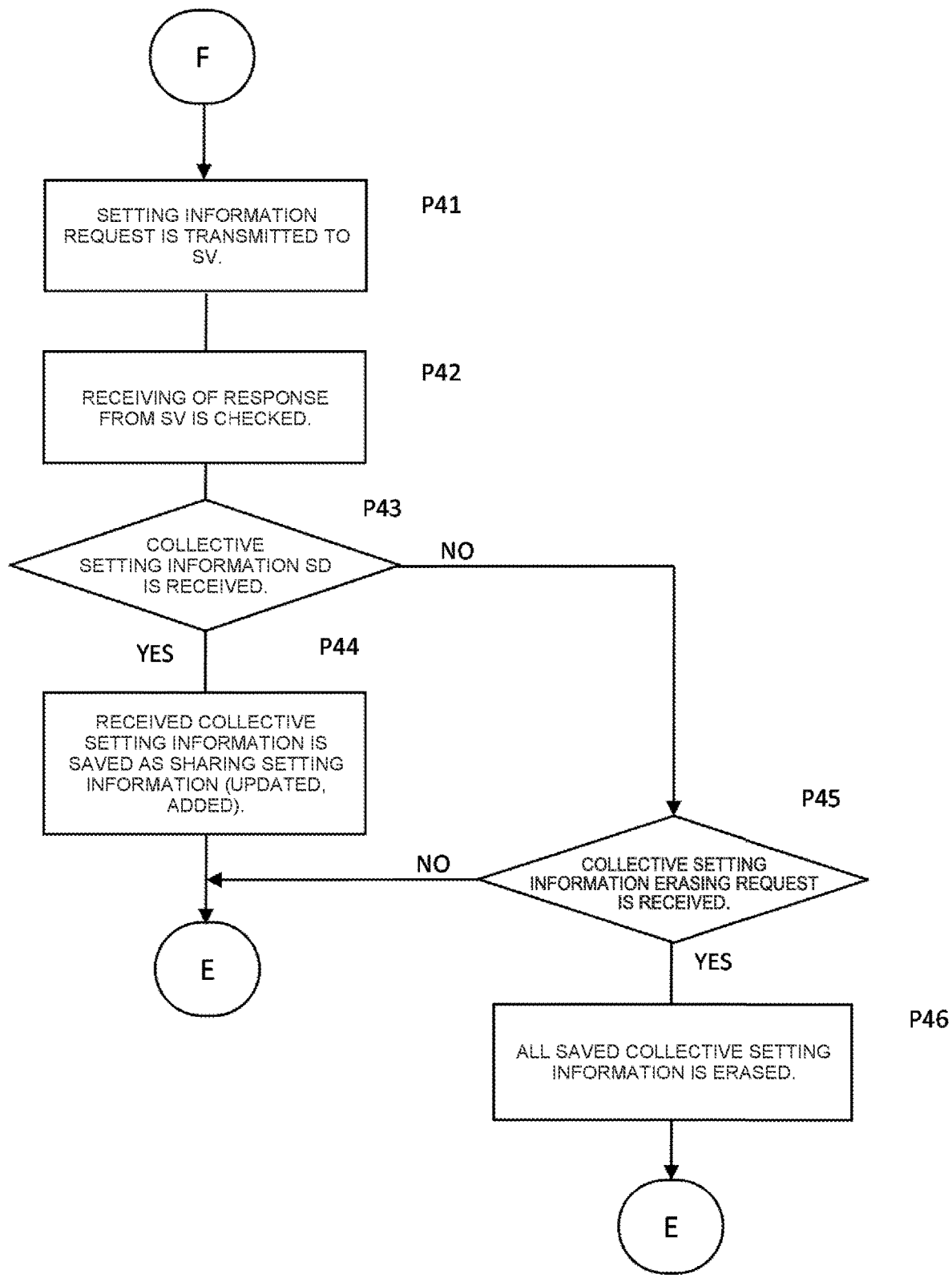
FIG. 27 is a flowchart of one embodiment of a setting information acquiring process in the information processing device of this disclosure.

FIG. 26 and FIG. 27 each shows a flowchart of one embodiment of a setting information acquiring process in the information processing device.

Here, similarly to FIG. 23, when a user sets and inputs, in the information processing device PC, inherent setting information CD that is effective only in this information processing device PC, this inherent setting information CD is saved in the storage 90.

Further, when an erasing request of collective setting information is transmitted from the setting management device SV, all of the pieces of collective setting information (sharing setting information) already saved in the storage 90 are erased.

Note that, differently from FIG. 23, when a date information request is transmitted to the setting management device SV, and then, as the response to this transmission, saving date information of the collective setting information SD is transmitted from the setting management device SV, the received saving date information and date information of the sharing setting information saved in the information processing device PC (sharing setting date information) are compared with each other. When the saving date information is newer, the collective setting information SD having the new saving date information is received from the setting management device SV and saved as the sharing setting information SD93.

In a step P21 in FIG. 26, similarly to the step P1 in FIG. 23, whether the setting information is inputted or not is checked.

When, in a step P22, the setting information is inputted, the process proceeds to a step P23. Otherwise, the process returns to the step P21.

In a step P23, an input operation of changing individual inherent setting information in the information processing device PC (inherent favorite), or an input operation of saving new inherent setting information is conducted, the process proceeds to a step P24. Otherwise, the process proceeds to a step P25.

In the step P24, similarly to the step P4 in FIG. 23, after the individual inherent setting information CD in the information processing device PC is updated and saved, the process returns to the step P21.

For example, when a new name is applied to the individual inherent setting information CD and this individual inherent setting information CD is saved, the new inherent setting information CD is added. When the individual inherent setting information is saved with the same name, the content of the inherent setting information CD is changed. Further, when an operation of erasing the inherent setting information CD is conducted, this inherent setting information CD is erased.

In the step P25, a date information request is transmitted to the setting management device SV.

In a step P26, whether a response from the setting management device SV is received or not is checked.

In a step P27, when saving date information is received from the setting management device SV, the process proceeds to a step P28. Otherwise, the process returns to the step P26.

In the step S28, the received saving date information is saved.

In a step P29, a date of the sharing setting information SD saved in the information processing device PC (sharing setting date information) is read.

When, in a step P30, the saving date is included in the sharing setting information SD, the process proceeds to a step P31. Otherwise, the process proceeds to a step P41 in FIG. 27.

In the step P31, the received saving date information and the read sharing setting date information are compared with each other.

When, in a step P32, the received saving date information is newer, the process proceeds to a step P41 in FIG. 27. Otherwise, the process returns to the step P21.

In the step P41 in FIG. 27, similarly to the step P5 in FIG. 23, the setting information request is transmitted to the setting management device SV.

In a step P42, whether a response from the setting management device SV is received or not is checked.

In a step P43, when collective setting information SD is received from the setting management device SV, the process proceeds to a step P44. Otherwise, the process proceeds to a step P45.

In the step P44, similarly to the step P8, the received collective setting information SD is saved as the sharing setting information SD and the process returns to the step P21 in FIG. 26. When sharing setting information SD having the same name already exists in the information processing device PC, this sharing setting information SD is updated. When sharing setting information SD having the same name does not exist in the information processing device PC, the sharing setting information SD is added.

When, in a step P45, similarly to the step P9, an erasing request of collective setting information is received, the process proceeds to a step P46. Otherwise, the process returns to a step P21 in FIG. 26.

In the step P46, similarly to the step P10, all of the pieces of collective setting information (sharing setting information SD) saved in the storage 90 of the information processing device PC are erased and the process returns to the step P21 in FIG. 26.

As described above, when the inherent setting information is saved in the information processing device PC, and further, the collective setting information SD having the saving date newer than that of the sharing setting information SD93 that is saved in the information processing device PC is received from the setting management device SV, the corresponding collective setting information SD is saved as the sharing setting information SD93.

As described above, by adding the saving date information 44 to the collective setting information SD and saving the corresponding collective setting information SD in the setting management device SV, and delivering the saved collective setting information to which the new saving date information is added to the information processing device PC, the sharing setting information saved in the information processing device PC can be always updated by the newest information.

Also in the case of this embodiment, similarly to FIG. 23, the shared sharing setting information SD is erased by the erasing request from the setting management device SV and is not erased by the input operation of erasing in the information processing device PC. On the other hand, the inherent setting information CD that is individually saved in the information processing device PC is erased by an input operation of erasing conducted by an intention of the user in the information processing device PC and is not erased by the erasing request from the setting management device SV.

Embodiment of the Setting Display Screen of the Print Setting Sharing

In order to set and input the setting contents of the setting items of the function included in the image forming device MFP in the setting management device SV, a printer driver of the image forming device MFP is installed in the setting management device SV.

Also in the information processing device PC, the printer driver of the image forming device MFP is similarly installed in the information processing device PC.

In the printer driver, for example, the setting contents of the setting items about the printing function can be set. In the setting management device SV, when the management person conducts a predetermined input operation, the setting screen for setting the setting contents of the setting items such as a number of copies, a paper feeding tray in which printing papers are saved, and an image quality, etc. (printer driver setting screen) is displayed on the display 13 of the setting management device SV.

In this disclosure, the printer driver setting screen of the setting management device SV includes a display region of the above-described "print setting sharing" as one of the setting items.

FIG. 28A and FIG. 28B each shows an explanation diagram of one embodiment of the setting display screen (printer driver setting screen) including the print setting sharing in the setting management device.

In the printer driver setting screen (G1) in FIG. 28A, a selection region of "sharing" and "not sharing" is shown in the display region of a "print setting sharing".

In this screen G1, when it is intended that the collective setting information SD is shared in the plurality of information processing devices PC, "sharing" is selected and inputted. When it is intended that the collective setting information SD is not shared in the plurality of information processing devices PC, "not sharing" is selected and inputted.

When "sharing" is selected and inputted, and further, a display region of "OK" is selected and inputted, the "print setting sharing" is enabled, the sharing setting flag F becomes "2" that indicates enabled (ON), and the collective setting information SD can be shared. Further, when the collective setting information SD is to be saved in the registry and the "print setting sharing" is enabled, "2" is added on the head of the data of the collective setting information SD and this data is saved.

On the other hand, when "not sharing" is selected and inputted, and further, the display region of "OK" is selected and inputted, the "print setting sharing" is disabled, the sharing setting flag F becomes "1" that indicates disabled (OFF), and the collective setting information SD is not shared.

Further, when the collective setting information SD is to be saved in the registry and the "print setting sharing" is disabled, "1" is added on the head of the data of the collective setting information SD and this data is saved.

In the printer driver setting screen (G1) in FIG. 28B, a check region (check box) is displayed on the left side of the "favorite print setting sharing" in the display region of the "print setting sharing".

In this screen G1, when it is intended that the collective setting information SD is shared in the plurality of information processing devices PC, the check region is selected and inputted. When it is intended that the collective setting information SD is not shared in the plurality of information processing devices PC, an input of unchecking the check region is conducted so that the check region is not selected and inputted.

In the screen G1 in FIG. 28B, there is shown a state in which the check region is selected and inputted and the collective setting information SD is shared.

Also in the screen G1 in FIG. 28B, when the check region of the "favorite print setting sharing" is selected and inputted, and further, the display region of "OK" is selected and inputted, the "print setting sharing" is enabled, the sharing setting flag F becomes "2" that indicates enabled (ON), and the collective setting information SD can be shared.

Further, when the collective setting information SD is to be saved in the registry and the "print setting sharing" is enabled, "2" is added on the head of the data of the collective setting information SD and this data is saved.

On the other hand, when an input of unchecking the check region of the "favorite print setting sharing" is conducted, and further, the display region of "OK" is selected and inputted, the "print setting sharing" is disabled, the sharing setting flag F becomes "1" that indicates disabled (OFF), and the collective setting information SD is not shared.

Further, when the collective setting information SD is to be saved in the registry and the "print setting sharing" is disabled, "1" is added on the head of the data of the collective setting information SD and this data is saved.

Although two embodiments of the printer driver setting screen (G1) including the display region of the "print setting sharing" are shown in FIG. 28A and FIG. 28B, the printer driver setting screen (G1) is not limited to the printer driver setting screen shown in FIG. 28A and FIG. 28B and the display region of the "print setting sharing" is not limited to the configuration of the display region shown in FIG. 28A and FIG. 28B and may be a screen in which the "print setting sharing" can be selected and inputted.

Embodiment of Print Setting Screen

Here, there is explained one embodiment in which, in the setting management device SV, the contents of the print setting items about the printing function are set and inputted, and the collective setting information (favorite) is saved.

FIG. 29 to FIG. 32 each shows an explanation diagram of one embodiment of a setting display screen including print setting items in the setting management device SV (print setting screen).

Note that the print setting screen is not limited to the print setting screen shown in FIG. 29 to FIG. 32.

A display region of the setting items about the printing function (number of copies, paper size, paper direction, and page aggregation) and a display region of the collective setting information (favorite) are shown in the print setting screen G2 of the print setting items in FIG. 29.

Although "default setting" is displayed in the display region of the collective setting information (favorite) in the print setting screen G2 of the print setting items in FIG. 29, the collective setting information (favorite) is not saved yet. For example, after a desired setting item among the setting items about the printing function is set and inputted and an input operation of changing the content of this desired setting item, etc. is conducted, a saving operation of the collective setting information (favorite) is conducted.

Figure 30:
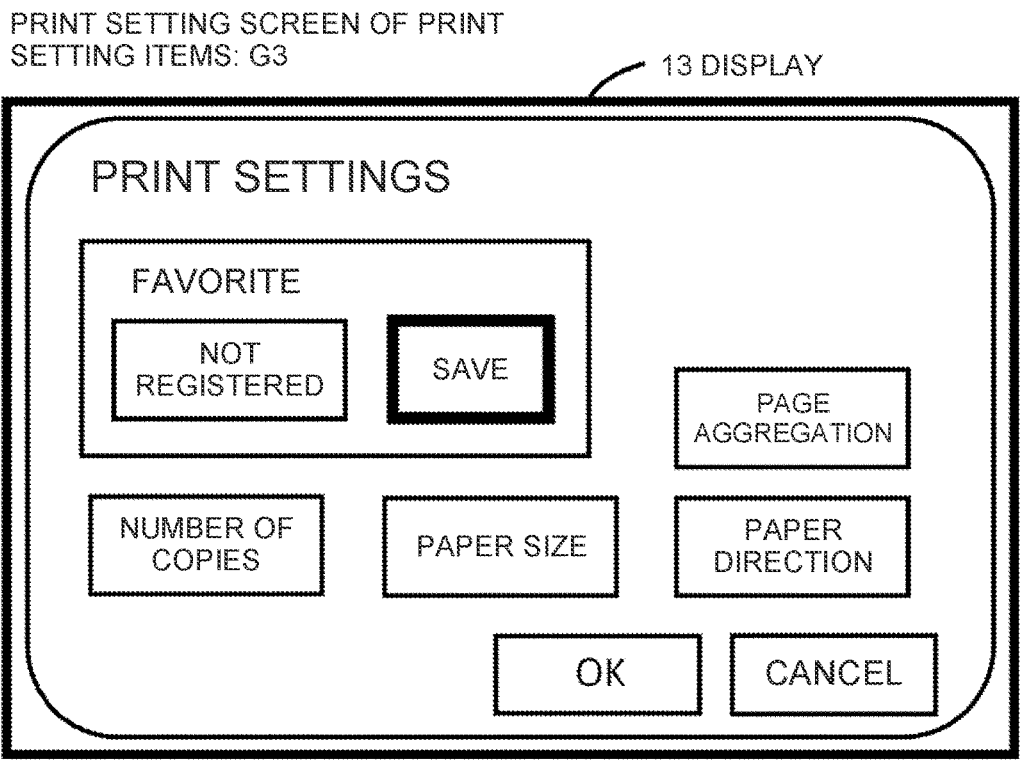
FIG. 30 is an explanation diagram of one embodiment of a setting display screen (print setting screen) including print setting items in the setting management device of this disclosure.

When the selection and input of changing the setting items about the printing function is conducted in the screen G2, a print setting screen G3 as shown in FIG. 30 is displayed.

In the print setting screen G3 in FIG. 30, "not registered" and "save" are displayed in the display region of the collective setting information (favorite).

The "not registered" indicates that the collective setting information (favorite) is currently not registered, and "save" is the region that is selected for saving the collective setting information (favorite).

Figure 31:
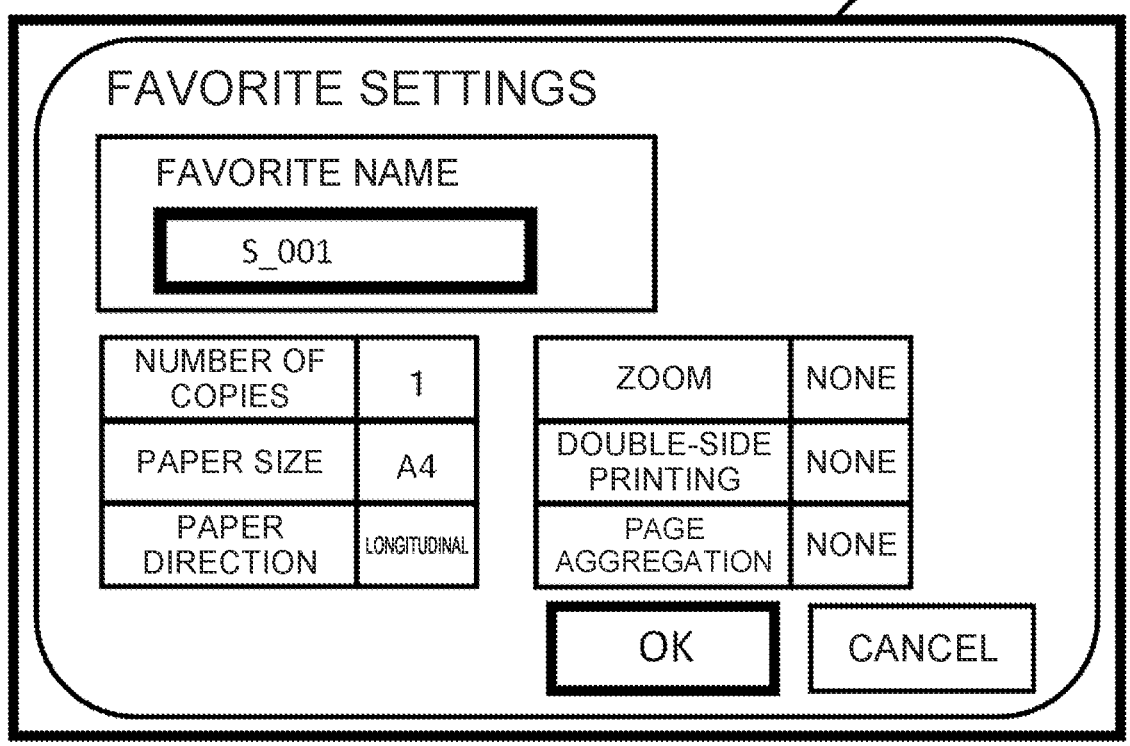
FIG. 31 is an explanation diagram of one embodiment of a setting display screen (print setting screen) including print setting items in the setting management device of this disclosure.

When selection and input of the display region of "save" in the screen G3 is conducted, a print setting screen G4 as shown in FIG. 31 is displayed.

The setting items about the printing function and the setting contents of the setting items are displayed in the print setting screen G4 in FIG. 31, and a region for inputting a name of the favorite is displayed in the display region of the collective setting information (favorite). The management person of the setting management device SV can confirm the displayed contents in the screen G4 and check whether the setting contents of the setting items about the printing function are the contents that the management person intends or not.

Further, when the setting contents of the setting items about the printing function are the contents that the management person intends, a desired name is inputted in a region for inputting the name of the favorite.

In the print setting screen G4 in FIG. 31, "S_001" is inputted as the name of the favorite.

Note that, when the setting contents of the setting items about the printing function are not the contents that the management person intends, the display region of "cancel" is selected and inputted in order to set again the setting contents of the setting item as intended.

When, in the screen G4, the name "S_001" of the favorite is inputted, and then, the display region of "OK" is selected and inputted, the collective setting information (favorite) having the name of "S_001" is saved in the storage 40.

Figure 32:
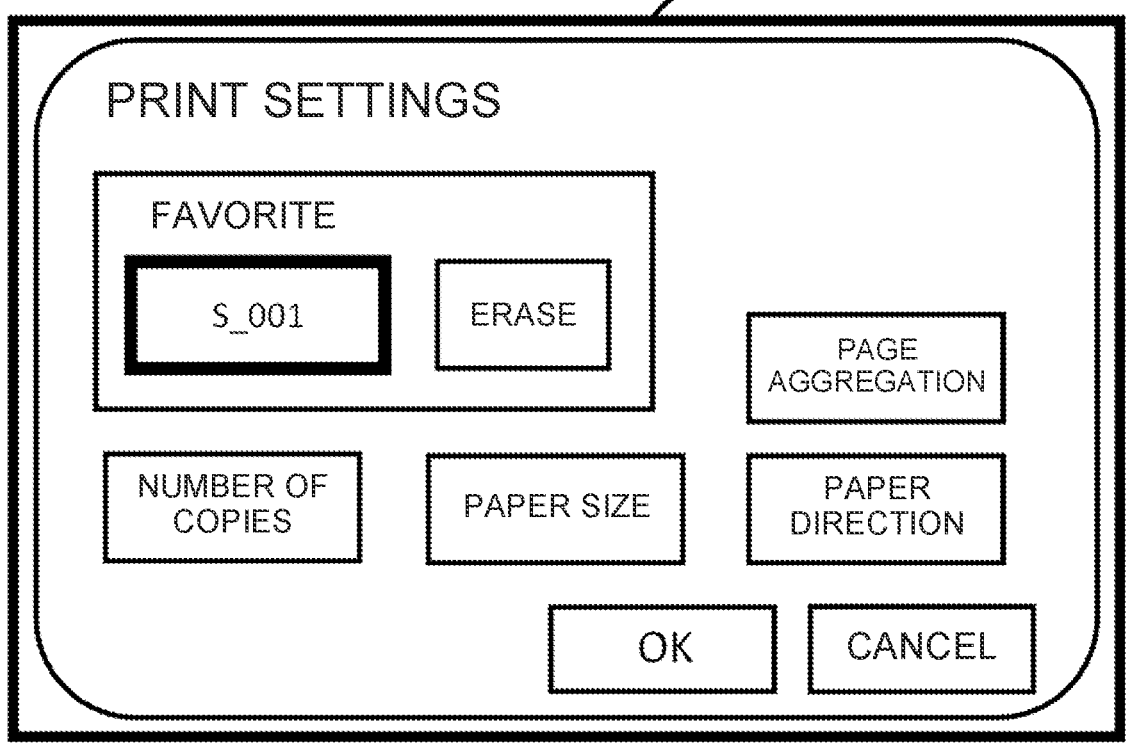
FIG. 32 is an explanation diagram of one embodiment of a setting display screen (print setting screen) including print setting items in the setting management device of this disclosure.

Further, when the display region of "OK" is selected and inputted, a print setting screen G5 as shown in FIG. 32 is displayed.

In the print setting screen G5, the name of the favorite "S_001" and "erase" are displayed in the display region of the collective setting information (favorite).

By confirming the displayed contents in this screen G5, the management person of the setting management device SV can recognize that the collective setting information (favorite) having the name of "S_001" is saved.

Note that, when another collective setting information (favorite) having the name of "S_001" is already saved in the storage 40, it is preferable that an update warning screen (G6) as shown in FIG. 33 is displayed in order to prevent unintended rewriting and updating.

In the update warning screen G6 in FIG. 33, a display region including a warning message such as, for example, "FAVORITE NAME IS ALREADY REGISTERED. UPDATE REGISTERED INFORMATION?" as well as "OK" and "cancel" may be displayed.

When it is intended that the collective setting information (favorite) having the name of "S_001" is updated, the management person of the setting management device SV may select and input "OK". When "OK" is selected and inputted, the collective setting information having the name of "S_001" (favorite) is rewritten and updated.

When it is not intended that collective setting information (favorite) having the name of "S_001" is rewritten and updated, the management person of the setting management device SV may select and input "cancel". When "cancel" is selected and inputted, the screen G4 for inputting the name of the collective setting information (favorite) is displayed again.

Further, when the display region of "erase" is selected and inputted in the print setting screen G5, the collective setting information (favorite) having the name of "S_001" is erased. When the collective setting information (favorite) is erased and, as described above, the collective setting information having the name of "S_001" is already shared in the information processing device PC, an erasing request is transmitted to the information processing device PC.

What is claimed is:

1. A setting information management method of a setting information management system that manages setting information about a function of an image forming device that is conducted in an information processing device, the method comprising:
    saving setting contents of a plurality of setting items about a function of the image forming device;
    saving of setting information in which collective setting information, including the setting contents that are respectively set for the plurality of setting items, is saved;
    determining of sharing setting in which the plurality of setting items including information of collective setting sharing that determines: whether saved collective setting information is commonly used in a plurality of information processing devices; and whether the saved collective setting information that is commonly used in the plurality of information processing devices is enabled;
    delivering of setting information in which, when the saved collective setting information that is commonly used in the plurality of information processing devices is determined as enabled, the saved collective setting information is delivered to the plurality of information processing devices; and
    acquiring of setting information in which collective setting information delivered to the information processing device is acquired and saved as sharing setting information;
    wherein, when the collective setting information that is commonly used in the plurality of information processing devices is enabled in the information of collective setting sharing, the collective setting information is commonly used in the plurality of information processing devices.

2. The setting information management method of the setting information management system according to claim 1, wherein:
    in a case in which the saved collective setting information that is commonly used in the plurality of information processing devices is set as enabled in the information of collective setting sharing, and
    when new collective setting information is added and saved in the saving of the setting information, added and saved collective setting information is delivered to the plurality of information processing devices in the delivering of setting information.

3. The setting information management method of the setting information management system according to claim 1, further comprising:
    requesting erasure of setting information in which, in a case that the saved collective setting information that is commonly used in the plurality of information processing devices is set as enabled in the information of collective setting sharing, the information of collective setting sharing is changed, such that the saved collective setting information that is commonly used in the plurality of information processing devices is disabled, a collective setting information erasing request, for erasing all pieces of collective setting information, transmitted to the plurality of information processing devices in which the saved collective setting information is shared; and
    erasing all pieces of sharing setting information saved in the plurality of information processing devices when the plurality of information processing devices receives the collective setting information erasing request.

4. The setting information management method of the setting information management system according to claim 3, further comprising:
    erasing in which,
    when saved collective setting information is erased,
    in the requesting erasure of setting information, an erasing request, for erasing erased collective setting information, is transmitted to an information processing device in which the erased collective setting information is shared, and
    when the information processing device receives the erasing request, sharing setting information corresponding to the erased collective setting information, among all the pieces of sharing setting information saved in the information processing device, is erased.

5. The setting information management method of the setting information management system according to claim 1,
    further comprising: receiving of setting information request in which a setting information request transmitted from the information processing device is received;
    wherein when the setting information request is received in the receiving of setting information request, the collective setting information that is saved in the saving of setting information is delivered to the information processing device that is a transmission source of the setting information request in the delivering of setting information.

6. The setting information management method of the setting information management system according to claim 1, wherein:
when the collective setting information is saved in the saving of setting information, the saved collective setting information and date information, about when a corresponding collective setting information is saved, are saved in association with each other;
when the sharing setting information saved in the information processing device is also saved in association with sharing setting date information that is date information about when collective setting information corresponding to the sharing setting information is saved, and when newest date information about when the collective setting information corresponding to the sharing setting information is saved includes a date newer than a date of the sharing setting date information saved in the plurality of information processing devices, collective setting information that is saved on the newest date is delivered to an information processing device in the delivering of setting information and sharing setting information saved in the information processing device is updated to the delivered collective setting information.

7. The setting information management method of the setting information management system according to claim 6, further comprising:
requesting of date information in which the information processing device requests transmitting newest date information about when collective setting information corresponding to sharing setting information that is saved in the information processing device;
acquiring of date information in which saving date information that is the newest date information is acquired;
determining of sharing setting date in which acquired saving date information and sharing setting date information saved in association with the sharing setting information are compared with each other; and
requesting of setting information in which, when the saving date information includes a date newer than a date of the sharing setting date information, transmitting the collective setting information corresponding to the sharing setting information is requested;
wherein, in the delivering of setting information, collective setting information saved on a requested newest date is delivered to an information processing device.

8. The setting information management method of the setting information management system according to claim 6, wherein:
when sharing setting information saved in the information processing device is not saved in association with the sharing setting date information,
in the delivering of setting information, collective setting information corresponding to the sharing setting information and including newest date information about when the corresponding collective setting information is saved is delivered to the information processing device.

9. The setting information management method of the setting information management system according to claim 1, further comprising: saving of inherent setting information in which the information processing device saves inherent setting information including setting contents that are used only in this information processing device and are respectively set for a plurality of setting items about a predetermined function,
the inherent setting information is capable of being added only in an information processing device in which the inherent setting information is saved and is capable of being erased only by an erasing request that is conducted in an information processing device in which the inherent setting information is added.

10. The setting information management method of the setting information management system according to claim 1, wherein:
in the saving of setting information,
when the collective setting information is saved, a predetermined name is applied to the collective setting information before the collective setting information is saved;
when new collective setting information is added and saved, a name different from a name of already saved collective setting information is applied to the new collective setting information before the new collective setting information is saved; and
when new collective setting information is to be saved with a name of already saved collective setting information, an update warning screen that indicates that collective setting information is to be rewritten and updated is displayed.

11. The setting information management method of the setting information management system according to claim 1, wherein:
the collective setting information is information that includes setting contents that are respectively set for a plurality of setting items about a printing function conducted by an image forming device; and
information of collective setting sharing is information of print setting sharing that determines whether collective setting information about the printing function is commonly used in the plurality of information processing devices.

12. The setting information management method of the setting information management system according to claim 1, further comprising: operating in which whether the saved collective setting information that is commonly used in the plurality of information processing devices is set as enabled in the information of collective setting sharing.

13. A setting management device that saves collective setting information that is-commonly used and that is connected, via a network, to an information processing device that uses the collective setting information to perform a function of an image forming device, the setting management device comprising:
a storage in which setting contents of a plurality of setting items about a function of the image forming device are saved;
a setting information saving circuitry saving the collective setting information including the setting contents that are respectively set for the plurality of setting items, in the storage;
a sharing setting determining circuitry in which the plurality of setting items include information of collective setting sharing that determines: whether the saved collective setting information is commonly used in a plurality of information processing devices; and by the information of collective setting sharing, whether the collective setting information that is commonly used in the plurality of information processing devices is enabled; and a setting information delivering circuitry that, when the sharing setting determining circuitry determines that the collective setting information that is commonly used in the plurality of information processing devices is enabled, delivers collective setting information saved in the storage to the plurality of information processing devices;

wherein delivered collective setting information is acquired and saved as sharing setting information by the information processing device, and only when the collective setting information that is commonly used in the plurality of information processing devices is enabled in the information of collective setting sharing, the collective setting information is commonly used in the setting management device and the plurality of information processing devices.

14. A setting information management system in which a setting management device that saves collective setting information commonly used and an information processing device that uses the collective setting information to perform a function of an image forming device are connected via a network, wherein:

the setting management device comprising:
  a storage in which setting contents of a plurality of setting items about a function of the image forming device;
  a setting information saving circuitry saving the collective setting information including the setting contents that are respectively set for the plurality of setting items, in the storage;
  a sharing setting determining circuitry in which the plurality of setting items include information of collective setting sharing that determines: whether the saved collective setting information is commonly used in a plurality of information processing devices; and by the information of collective setting sharing, whether the collective setting information that is commonly used in the plurality of information processing devices is enabled; and
  a setting information delivering circuitry that, when the sharing setting determining circuitry determines that the collective setting information that is commonly used in the plurality of information processing devices is enabled, delivers collective setting information saved in the storage to the plurality of information processing devices;
wherein the information processing device comprises a setting information acquirer that acquirers delivered collective setting information and saves the delivered collective setting information as sharing setting information, and when the collective setting information that is commonly used in the plurality of information processing devices is enabled in the information of collective setting sharing, the collective setting information is commonly used in the setting management device and the plurality of information processing devices.

15. The setting information management system according to claim 14, wherein;
  the setting management device further comprises a printer driver that conducts functions of the setting information saving circuitry, the sharing setting determining circuitry, and the setting information delivering circuitry, and
  the information processing device further comprises a printer driver that conducts a function of the setting information acquirer.

16. A non-transitory computer readable medium storing a printer driver that includes one or more instructions to control a setting management device, the setting management device saving collective setting information that is commonly used and connected via a network to an information processing device, the information processing device using the collective setting information to perform a function of an image forming device, wherein when the one or more instructions are executed by at least one processor, the at least one processor controls the setting management device to:
  save setting contents of a plurality of setting items about a function of an image forming device;
  save the collective setting information including the setting contents that are respectively set for the plurality of setting items;
  determine, by information of collective setting sharing, whether saved collective setting information is commonly used in a plurality of information processing devices, the plurality of setting items including the information of collective setting sharing that determines whether the saved collective setting information is commonly used in the plurality of information processing devices; and
  deliver, when the saved collective setting information that is commonly used in the plurality of information processing devices is determined as enabled, the saved collective setting information to the plurality of information processing devices,
wherein delivered collective setting information is acquired and saved as sharing setting information by the plurality of information processing devices.

* * * * *